United States Patent [19]

Krishnaiyer et al.

[11] 4,023,163

[45] May 10, 1977

[54] HIGH SECURITY ALARM TRANSMISSION SYSTEM

[75] Inventors: Ramesh Krishnaiyer, Halls Corners; John C. Donovan, Whitefish Bay; Frank J. Esser, Waukesha, all of Wis.

[73] Assignee: Johnson Controls, Inc., Milwaukee, Wis.

[22] Filed: Sept. 19, 1975

[21] Appl. No.: 615,180

[52] U.S. Cl. .............................. 340/409; 340/411; 340/416

[51] Int. Cl.[2] .............................. G08B 29/00

[58] Field of Search ................ 340/146.1 A, 164 R, 340/213 R, 214, 216, 288, 348, 409, 410, 412, 416, 411

[56] References Cited

UNITED STATES PATENTS

| | | | |
|---|---|---|---|
| 3,713,142 | 1/1973 | Getchell | 340/164 R X |
| 3,803,594 | 4/1974 | Klein et al. | 340/409 |

*Primary Examiner*—Alvin H. Waring

*Attorney, Agent, or Firm*—Johnson, Dienner, Emrich & Wagner

[57] ABSTRACT

An alarm transmission system for transmitting alarm and status information from a secured area to a monitoring area over a transmission line includes a code source in the secured area which provides a line security code for securing the transmission line, an alarm source which modifies the line security code in the event of an alarm condition, and a data selection network which enables preselected bits of the line security code and a further bit representing the access/secure status of the secured area to be transmitted to the monitoring area during preassigned time slots for comparison at the monitoring area with corresponding bits of a reference code provided by a reference code source, and an access/source status bit to permit an alarm to be indicted when one or more of the compared bits differ. In one embodiment, the code sources comprise code generators at the secured and monitoring areas which include a working code generator which produces the code, a reset code generator operable upon command to load a random code word into the working generator and a preset code circuit operable upon command to load a preset code word into the reset generator, the commands being provided by a command generator at the monitoring area. In a second embodiment, line security code words and alarm code words are stored at the secured and monitoring areas, the line security code words being read out periodically and compared at the monitoring area to secure the transmission line, and the alarm words being read out and compared to indicate an alarm condition.

43 Claims, 27 Drawing Figures

COMMAND GENERATOR 31

FREQUENCY DIVIDER 53

INPUT LATCH CIRCUIT 69

INPUT PULSE AND RESET PULSE GENERATOR 70

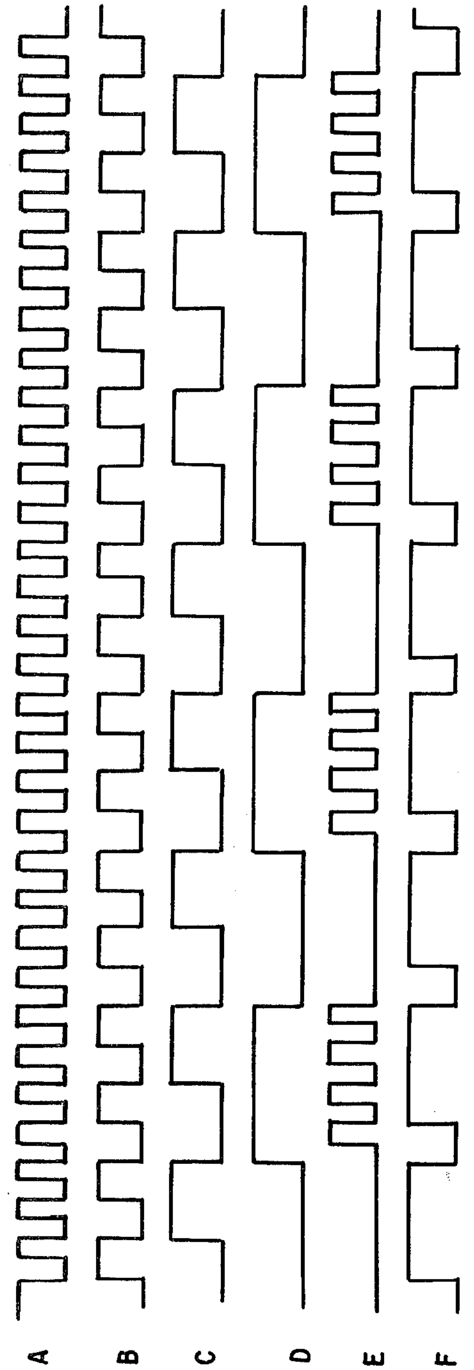
FIG. 6 TIMING DIAGRAM FOR CLOCK AND FREQUENCY DIVIDER
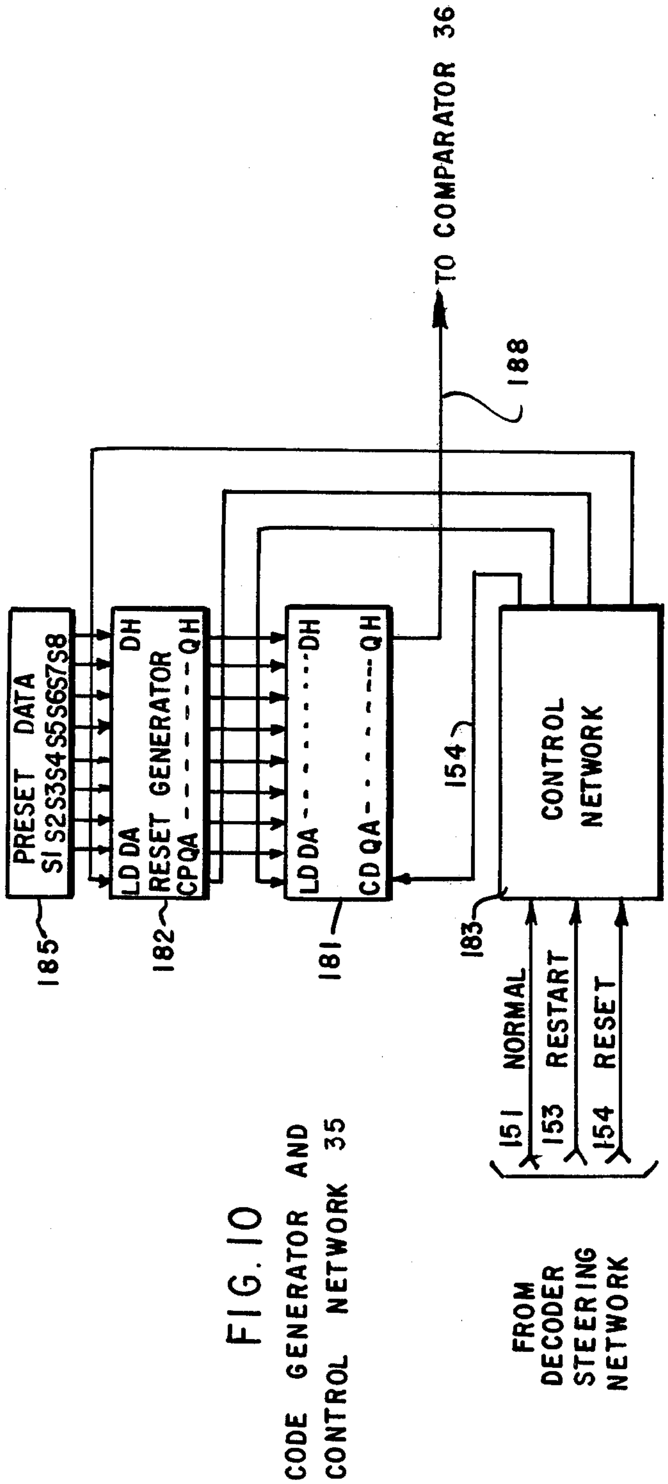
FIG. 10 CODE GENERATOR AND CONTROL NETWORK 35

CODE GENERATION & CONTROL NETWORK

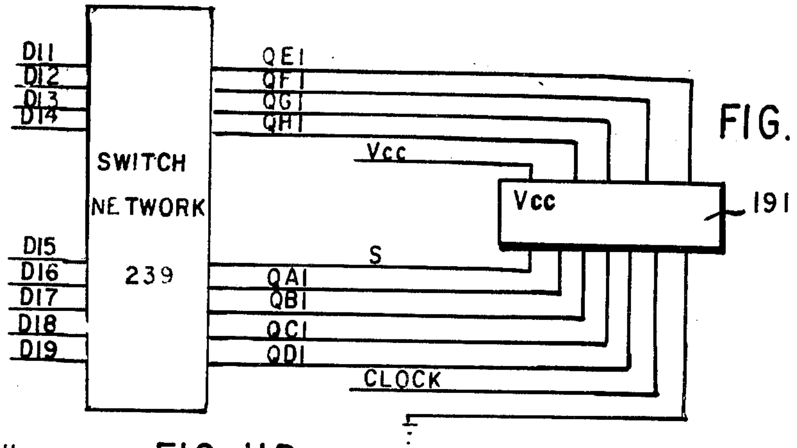
FIG. 11A
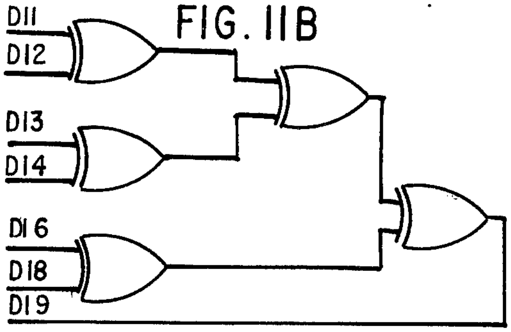
FIG. 11B
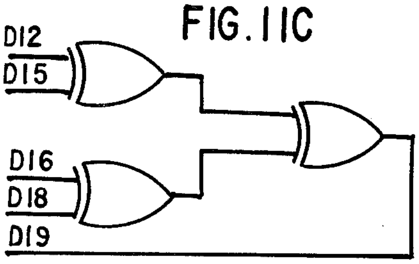
FIG. 11C
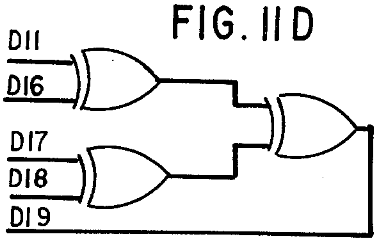
FIG. 11D
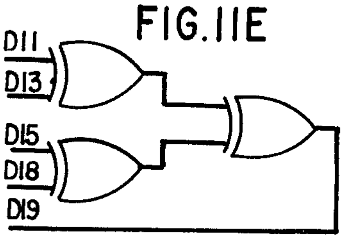
FIG. 11E
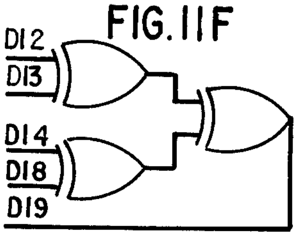
FIG. 11F
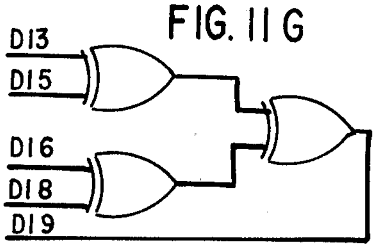
FIG. 11G
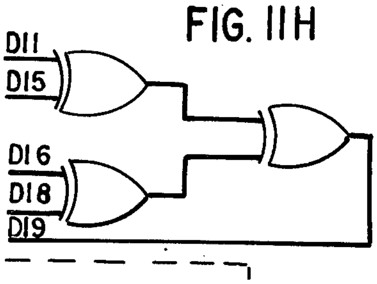
FIG. 11H
FIG. 14
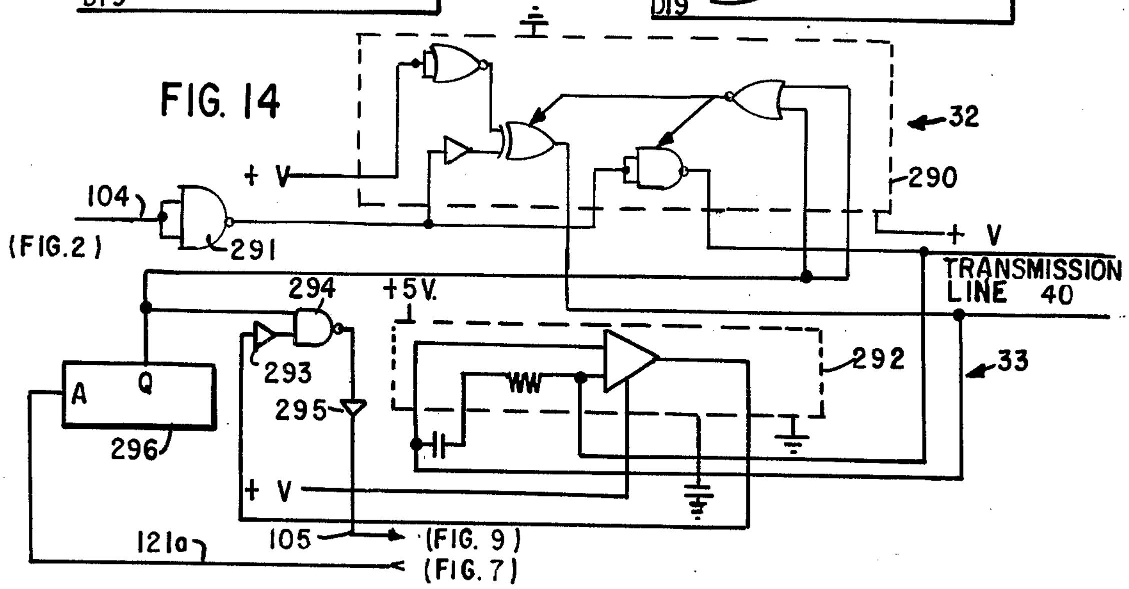

COMPARATOR 36

COMPARATOR

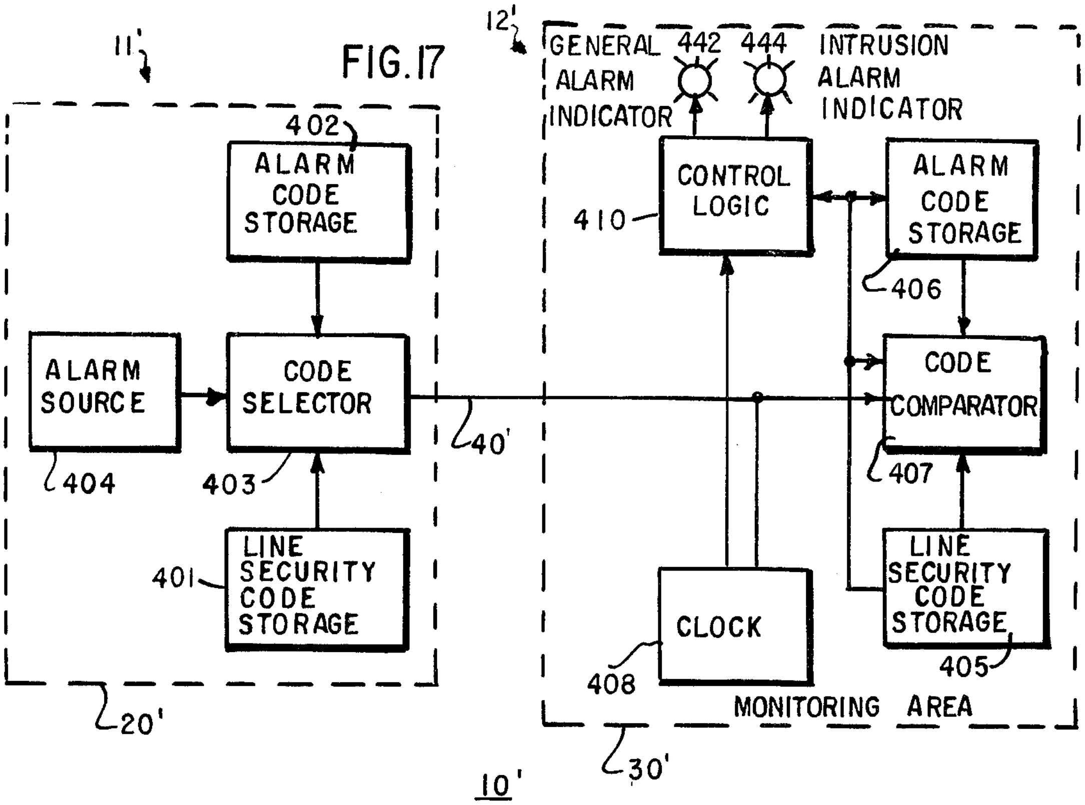

FIG. 17
11'
12'
GENERAL ALARM INDICATOR
442
444
INTRUSION ALARM INDICATOR
402
ALARM CODE STORAGE
CONTROL LOGIC
410
ALARM CODE STORAGE
406
ALARM SOURCE
CODE SELECTOR
CODE COMPARATOR
40'
404
403
407
401
LINE SECURITY CODE STORAGE
CLOCK
LINE SECURITY CODE STORAGE
405
408
MONITORING AREA
20'
30'
10'

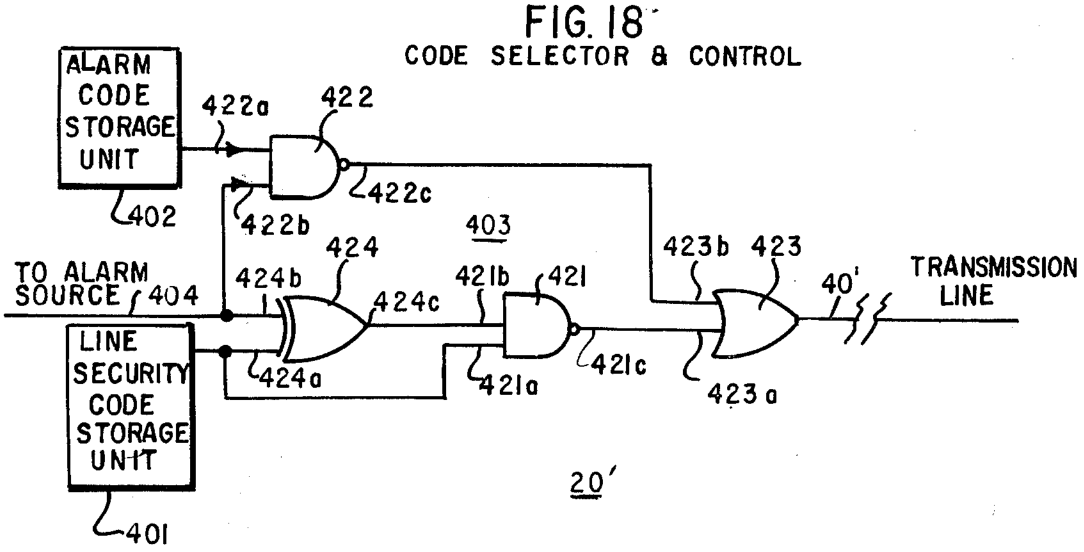

FIG. 18
CODE SELECTOR & CONTROL
ALARM CODE STORAGE UNIT
402
422a
422
422c
422b
403
TO ALARM SOURCE 404
424b
424
424c
421b
421
423b
423
40'
TRANSMISSION LINE
LINE SECURITY CODE STORAGE UNIT
424a
421a
421c
423a
401
20'

HIGH SECURITY ALARM TRANSMISSION SYSTEM

BACKGROUND OF THE INVENTION

1. Field of the Invention

This invention relates to security systems, and more particularly, to an intrusion alarm system for securing a transmission line which interconnects a protected a area with a monitoring area.

2. Description of The Prior Art

In an intrusion detection system, the line of communication between the protected area and the central monitoring area is the most accessible and the most vulnerable link for attack. The ability of attackers to compromise security techniques commonly used in intrusion detection systems has necessitated the development of more sophisticated techniques to minimize the vulnerability of the communication link.

A fairly high degree of alarm security and integrity has been obtained in some systems by using a DC alarm line monitor. Even though such systems provide a moderately high level of line security, it is still defeatable by a skilled attacker.

Accordingly, more sophisticated line security techniques have been developed. Recent advances include the utilization of signals of a pseudo-random nature as a line security code which is generated continuously, or periodically, and transmitted to a monitor over the communication link. The line security code may be encoded with alarm status information which is decoded and displayed at the monitor. In one such system, disclosed in our U.S. Pat. No. 3,735,353, entitled "Alarm Transmission Line Security System Utilizing Pseudo-random Coding," identical arbitrary binary codes are generated by linear shift register code generators located in both the protected area and the monitoring area and the codes are compared in the monitoring area. The failure of the codes to agree is registered as an alarm. The arbitrary code bits are pseudo-random in nature and intrusion alarms are indicated by systematic complementing of the code bits issuing from the protected area.

While the use of pseudo-random code techniques provides a high degree of security for the transmission line and makes it difficult to compromise the system, synchronization of the two code generators is essential and, in the event the code generators get out of synchronization, the system may be in a virtually continual state of alarm. This might happen, for example, if a noise pulse was accepted as a clock pulse by the code generator at the protected area, or if an attacker deleted or added an extra clock pulse.

A further system which minimizes such synchronization problems employs a code generator at a monitoring area which generates a purely random code sequence which is transmitted over the transmission line to the protected areas and encoded with alarm data. The digital random signal is also encoded at the monitoring area to produce coded signals for comparison with the encoded alarm signal received from the protected area. The received alarm code is compared with the encoded sequence generated at the monitoring area, the alarm status of the protected area being extracted as a result of the comparison.

Thus, two approaches have been indicated above. One of the approaches involves use of a pseudo-random code which is continuously generated. The other approach involves the use of a completely random code. It would be desirable to have a security alarm system characterized by the simplicity of the pseudo-random code generation as well as the randomness of the line codes as provided when a random signal generator is employed. It would further be desirable to be able to arbitrarily modify the random code sequence at the monitoring area whenever modification is desired.

A further consideration is that present security practices require the ability to transmit fundamentally different types of signals in each communication direction. Thus, in addition to the transmission of line security code and alarm data, it is often desirable to transmit to the monitoring area, the status of access/secure switches located in the protected area and to activate from the monitoring area a motion simulator in the secured area to accomplish a remote test function.

One example of a system which enables bidirectional transmission of different information is disclosed in the U.S. Pat. No. 3,792,470 of John C. Donovan, Carl F. Klein, Lawrence B. Korta, and Ramesh Krishnaiyer, which is entitled "Coded Tone Multiplexed Alarm Transmission System." In this system, a tone generator driven by a pseudo-random code generator provides a line supervisory code comprised of a selected sequence of tone signals of first and second frequencies which is transmitted to the central monitor and compared with a reference code. Access/secure status is transmitted to the central monitor by enabling the tone generator to provide tone sequences comprised of different pairs of frequencies for indicating either an access or a secure condition for the protected area. The system further provides for remote test of alarm sensors through the generation of a test command which is transmitted to the protected area for enabling a suitable motion simulator apparatus.

While the referenced system has the ability to transmit different types of signals between the protected area and the monitoring area, it would be desirable to have a system which enables information in addition to access/secure status and line monitoring codes to be transmitted from the secured area to the monitoring area and further commands other than synchronizing signals and test commands to be transmitted from the monitoring area to the protected area over the common transmission line.

SUMMARY OF THE INVENTION

It is an object of the present invention to provide a secured line alarm data transmission system which affords a high level of security for a transmission line which carries alarm data from a protected area to a monitoring area.

It is another object of the invention to provide a secured line security alarm transmission system in which alarm signals are indistinguishable from line security signals.

Another object of the invention is to provide a security alarm system which employs coded line security codes in which the complexity of the codes is arbitrary.

A further object of the invention is to provide a secured line intrusion alarm system in which an intrusion alarm can be distinguished from a line alarm.

A further object of the invention is to provide a security system which permits bidirectional transmission of fundamentally different types of information between a monitoring area and a secured area over a common communication link.

Another object of the invention is to provide a secured line alarm transmission system which compensates for transmission delays.

Yet another object of the invention is to provide a security system employing an intrusion alarm sensor in which the operation of the alarm sensor can be tested upon command from the monitoring area.

These and other objects are achieved by the present invention which has provided a security system which employs the transmission of digital codes over a communication line which interconnects a protected area with a monitoring area. A code source at the secured area provides a line security code which is transmitted to the monitoring area over the transmission line, and a code source at the monitoring area provides a reference code which is compared with the line security code provided by the code source in the secured area.

In accordance with one embodiment, the code source at the secured area comprises a line security code generator means which generates a pseudo-random code which is transmitted over the transmission line to the monitoring area. The code source at the monitoring area includes a reference code generating means which generates a further pseudo-random code which is identical to the code provided by the line security code generator in a secured area. The line security code and the reference code are compared at the monitoring area and in the event the codes fail to compare, an alarm is indicated. To transmit alarm status information, the line security code is modified, such as by complementing the bits of the line security code, in response to an alarm condition, whereby in the comparison of the modified line security code with reference code at the monitoring area, the presence of an alarm condition is indicated.

The system further enables information in addition to the line security code to be transmitted from the protected area to the monitoring area. Such information may, for example be the status of an access/secure switch located in the protected area. To this end, a data selection means located in the protected area is operable to define a plurality of time slots and to cause a predetermined number of the bits of the line security code to be transmitted during certain ones of the time slots and at least a further data bit, representative of access/secure data, to be transmitted to the monitoring data during a further time slot. Since the data selection means enables only a portion of the line security code sequence to be transmitted, the probability that an attacker will be able to defeat the system is minimized.

The system further provides for the initiation of various operations from the monitoring area. The command generating means at the monitoring area provides a plurality of command signals for effecting the control functions. One of the command signals provided by the command generating means is a synchronizing signal which synchronizes the operation of the apparatus located in the protected area with the apparatus located at the monitoring area. A further command signal actuates a motion simulator in the protected area to test the operability of an intrusion detector.

The command generating means also provides command signals for effecting synchronization of the code generating means in the protected area with the reference generating means in the event of a synchronization problem as may be caused by noise or by a person attempting to compromise the system.

In an exemplary embodiment, the code generating means at the protected area comprises two code generators, one of which is referred to as a working generator which provides the line security code for transmission to the monitoring area. The other code generator is a reset generator, which also produces a pseudo-random sequence, that is used to provide a new starting word to the working generator in response to a command provided from the monitoring area.

Similarly, the reference code generator in the monitoring area also comprises a working code generator and a reset code generator which operate in synchronism with the comparable code generators in the secured area.

The command generating means may provide a further command to effect the loading of a fixed data word into the reset generators in the event the reset generators are out of synchronization.

In accordance with a second embodiment of the invention, the code source in the secured area comprises a suitable code storage means which enables a plurality of different line security codes and a plurality of different alarm codes, each of which is different from the line security codes, to be stored at the protected area. A similar code storage means at the monitoring area stores a plurality of line security codes and a plurality of alarm codes, which are identical to the codes stored at the protected area. The line security code is periodically read out from storage at the protected area and transmitted to the monitoring area over the transmission line. The corresponding line security word stored at the monitoring area is retrieved from the storage means in the monitoring area and is compared with the code word received from the protected area. Failure of the compared words to agree indicates an alarm condition for the protected area.

In the event of an alarm condition at the protected area, transmission of the line security code is inhibited and an alarm code is transmitted to the monitoring area. The failure of the alarm code to agree with the line monitoring code which is normally provided at the monitoring area causes a control means to initiate a second comparison in which a word is read from the alarm storage means at the monitoring area and compared with the received alarm code.

The system provides a further comparison means which permits distinguishing between intrusion alarms and line alarms.

BRIEF DESCRIPTION OF THE DRAWINGS

FIG. 6 is a timing diagram for clock and frequency divider circuits of the command generator shown in FIG. 2;

FIG. 10 is a block diagram of a code generation and control network employed in the monitor receiver shown in FIG. 2;

FIG. 11A–11H illustrate various reprogramming feedback connections for the code generators shown in FIG. 11;

FIG. 14 is a schematic representation of a line driver and receiver for the monitoring receiver shown in FIG. 2;

FIG. 17 is a block diagram of a second embodiment for a security system provided in accordance with a second embodiment of the invention;

FIG. 18 is a schematic representation of zone monitoring apparatus of the system shown in FIG. 17.

DESCRIPTION OF PREFERRED EMBODIMENTS

General Description

Figure 1:
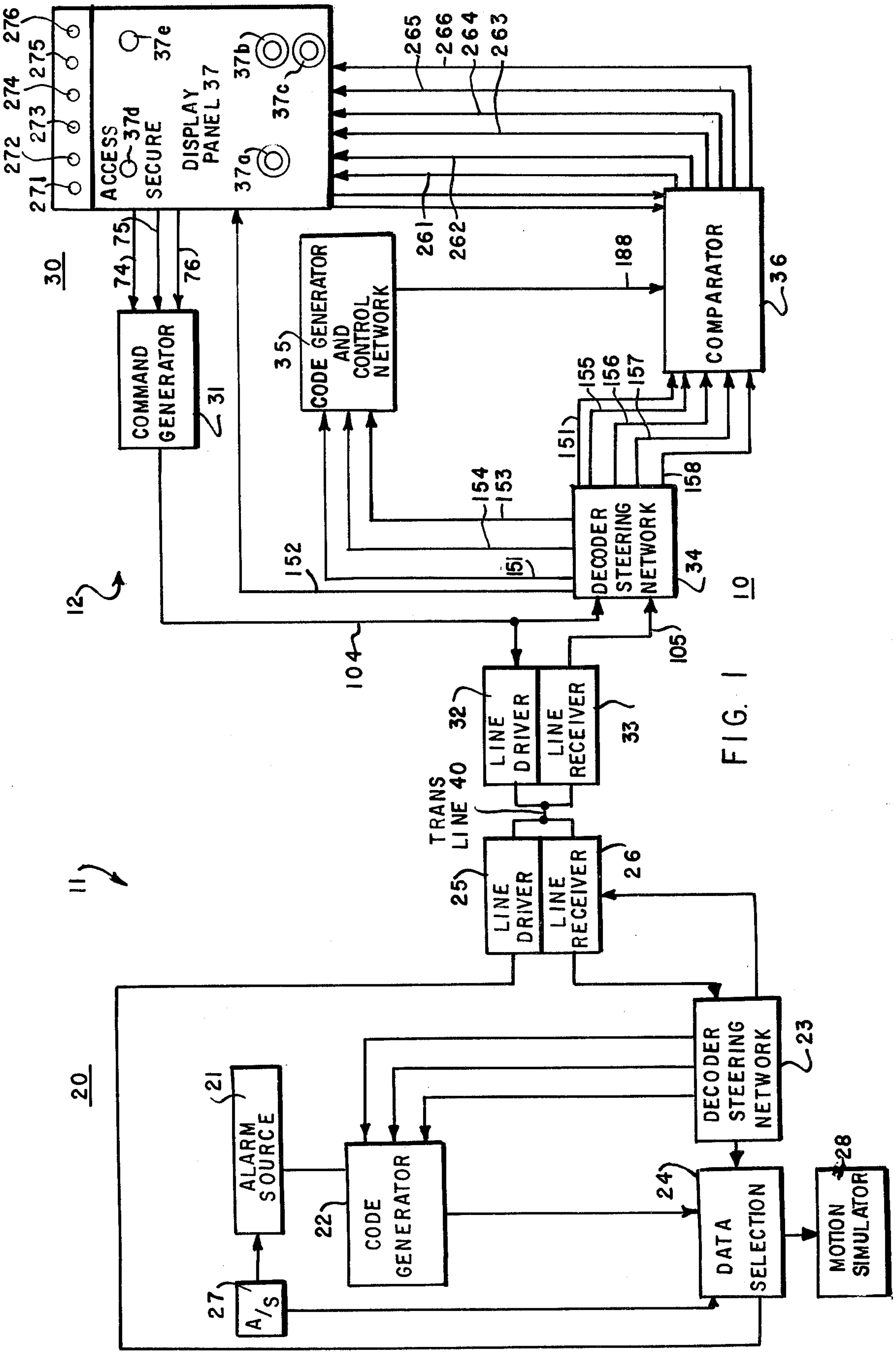
FIG. 1 is a block diagram of one embodiment for a security system including a zone monitor and monitor receiver provided the present invention.

Referring to FIG. 1, there is shown a block diagram of one embodiment for a high security point to point alarm transmission system 10 provided by the present invention. The system includes a zone monitor 20 at a protected area 11 which effects the transmission of alarm information provided by an alarm source 21 to a monitor receiver 30 at a monitoring area 12 over a communication channel, such as a transmission line 40 which interconnects the zone monitor 20 and the monitor receiver 30.

In one application of the system to an intrusion detection system, the alarm source 21 comprises an intrusion detector located in an area to be protected for indicating unauthorized entry of a protected area. Typically, the protected area may be a room of a building, and the intrusion detector is operable to provide an alarm output in response to the detection of a human motion within the protected area. However, other types of alarm indications, such as the presence of a fire, may be conveyed from the protected area to the monitoring area 12.

To provide security for the transmission line 40 as well as to enable the transmission of alarm information, identical arbitrary binary codes are provided in the monitoring and protected areas and compared in the monitoring area. Failure of the codes to agree is registered as an alarm condition. To this end, the zone monitor 20 includes a code generator 22 which provides a line security code which is transmitted over the transmission line 40 to the monitor receiver 40 in the monitoring area. The monitor receiver 30 includes a reference code generator 35 which provides a code identical to the line security code provided by the code generator 22 of the zone monitor 20 and the received code is compared with a reference code in a comparator circuit 36. Intrusion alarms may be indicated by the systematic complementing of all code bits issued from the protected area. The arbitrary codes are pseudo-random in nature being generated by linear shift sequence generators.

One example of a security system employing linear shift register sequence generators to generate pseudo-random codes is disclosed in out U.S. Pat. No. 3,375,353, entitled "Alarm Transmission Line Security System Utilizing Pseudo-random Encoding." The code generators disclosed in the patent comprise a multistage shift register having outputs of preselected stages connected over an "exclusive OR" circuit to the input stage of the shift register such that when the shift register has pulsed in the normal manner, the output from any stage of the register forms a pseudo-random digital sequence.

The security system 10 of the present invention provides for the reset of the code generators in the protected area and the monitoring area to identical starting points in the event of synchronization problem, as might occur, for example, if the noise pulse is accepted as a clock pulse by the code generator in the secured area, or if an attacker deleted or added an extra clock pulse.

Figures 11, 16:
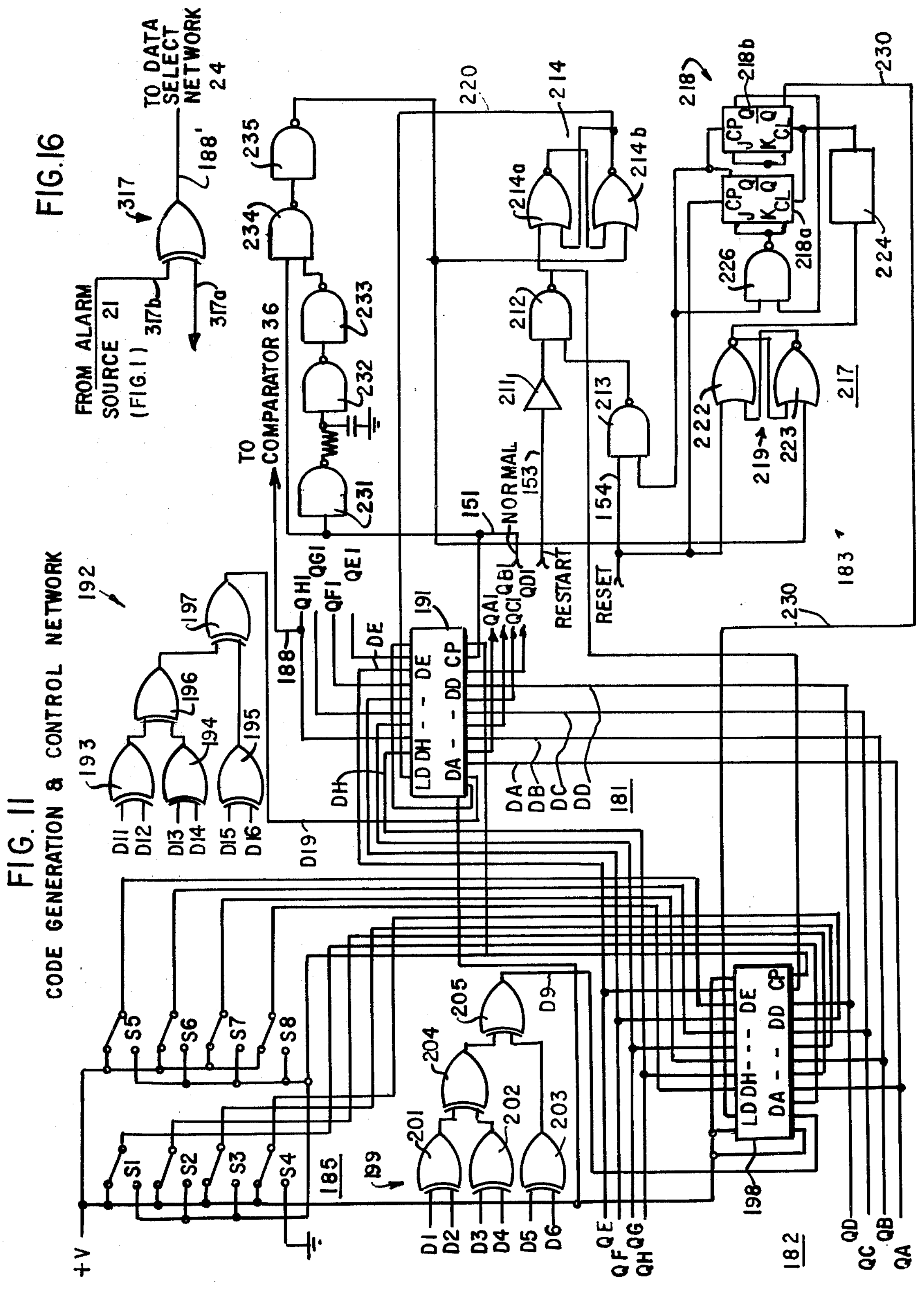
FIG. 11 is a schematic representation of the code generator and control network shown in FIG. 10.
FIG. 16 is a code complementing circuit employed in the code generator of the zone monitor.

Referring to FIGS. 10 and 11, which show the details of the code generator and control network 35 of the monitor receiver 30, two code generators 181 and 182 are employed in the monitoring area 12. Code generator 181 is referred to as a working code generator and code generator 182 is referred to as a reset code generator. The code generator 22 of the zone monitor 20 also includes a working code generator and a reset code generator which are identical to the code generators 181 and 182. The working code generator in the protected area produces the actual code sequence which is returned to the monitoring area over the transmission line and the working code generator 181 in the monitoring area produces the reference code which is compared with the returned code to assure the security of the transmission line 40. The reset generators, such as reset generator 182 in the monitor receiver 30, also produce a code sequence, which is used to provide a new starting word for the working code generators. In the event the reset generators fall out of synchronization, an arbitrary code word provided by a preset data circuit 185 of code generator 35 is loaded, upon command, into the reset code generator 182. The code generator 22 of the zone monitor 20 includes an identical preset data circuit which loads an identical arbitrary code word into the reset code generator of the zone monitor 20.

The commands for effecting the reset of the working code generators in the protected area and the monitoring area and for effecting restart for the reset generators in the protected area and the monitoring area are provided by a command generator 31 (FIG. 1) of the monitor receiver 30. Command generator 31 also provides a synchronizing signal which is transmitted over the transmission line 40 to the zone monitor 20 at the protected area and which is extended to the code generator and control network 35 of the monitor receiver 30 in the monitoring area for synchronizing the operation of the code generators. The manner in which the command signals are generated and employed will be described in more detail hereinafter.

As shown in FIG. 1, mode select switches 37*a*, 37*b* and 37*c* located on the display panel 37 enable the selection of operating modes, other than a normal mode, including a restart mode, a reset mode and remote test mode for the system. In the normal mode, the command generator 31 generates a synchronizing signal for controlling the operation of the code generator 22 of the zone monitor 22 and the code generator 35 of the monitor receiver 30. The alternative modes include a restart mode which is initiated by operating switch 37*a*, a reset mode which is initiated by operating switch 37*b*, and a remote test mode which is initiated by operating switch 37*c*.

As shown in FIG. 1, the zone monitor 20 further includes a decoder steering network 23 and a data selection network 24. The command signals generated by the command generator 31 of the monitor receiver 30 are transmitted over the transmission line 40 and received by a line receiver 26 of the zone monitor 20 and passed to the decoder steering network 23. The decoder steering network 23 decodes the command signals by the command generator 31 and issues appropriate instructions to the code generator 22 and the data selection network 24. The line security code provided by the code generator 22 is extended to the data selection 24 which in turn passes the line security code to a line driver 25 of the zone monitor 20 which transmits the coded sequence to the monitor receiver 30 over the transmission line 40.

The data selection network 24 also enables additional information, such as the status of access/secure switch 27 associated with alarm source 21, to be transmitted to the monitoring area. The data selection network 24 defines a plurality of time slots and controls the transmission of fundamentally different types of data during different selected time slots. For example, in the exemplary embodiment, the data selection network defines four time slots. In the first three time slots, bits from the pseudo-random sequence are returned to the monitoring area while in the fourth time slot, a logic one or logic zero bit indicative of the status of the access/secure switch 27 is returned. The status of the access/secure switch 27 is then compared with the status of an access/secure switch at the monitoring area and an alarm is registered if they differ. It is pointed out, that in this embodiment, the code generator 22 is clocked during all four time intervals and its output is merely inhibited during the time the access/secure switch status is being transmitted. This technique tends to compound the problem of a system attacker who attempts to compromise the system since only three fourths of the pseudo-random line security code is being transmitted.

The number of time intervals in a cycle can be expanded to vary the relative time weighting of the line security code data and the access/secure switch status. For example, the access/secure status might be checked only once in ten clock cycles. In addition, by expanding the number of time intervals, other types of data might be returned to the monitoring area for display such as tamper switch status, a transfer to stand-by power, and the like.

The monitor receiver 30 further includes a line driver 32 which transmits the command signals provided by command generator 31 to the zone monitor 20 over transmission line 40. A line receiver 33 receives the returned data and extends such data to a decoder steering network 34. The decoder steering network decodes the command signals issued by the command generator 31 and issues the proper instructions to the code generator 35 and steers the received data to proper inputs of the comparator circuit 36. The decoder steering network also issues instructions to the comparator circuit 36 as to the operating mode of the system.

The comparator circuit 36 accepts data from the decoder steering network 34 provided by the zone monitor 20 and compares it with the reference code provided by the reference code generator 35 and provides outputs to the display panel 37 indicating the results of the comparison.

In the exemplary embodiment, the command generator 31 issues one of four system commands when so instructed. In addition to the normal command, the reset command, and restart commands, referred above, the command generator 31 is operable in response to operation of switch 37*c* to generate a remote test command which is transmitted over the transmission line 40 to the zone monitor for effecting energization of a motion simulator 28 to test the operability of the alarm source 21.

DETAILED DESCRIPTION OF MONITOR RECEIVER

Command Generator

Figure 2:
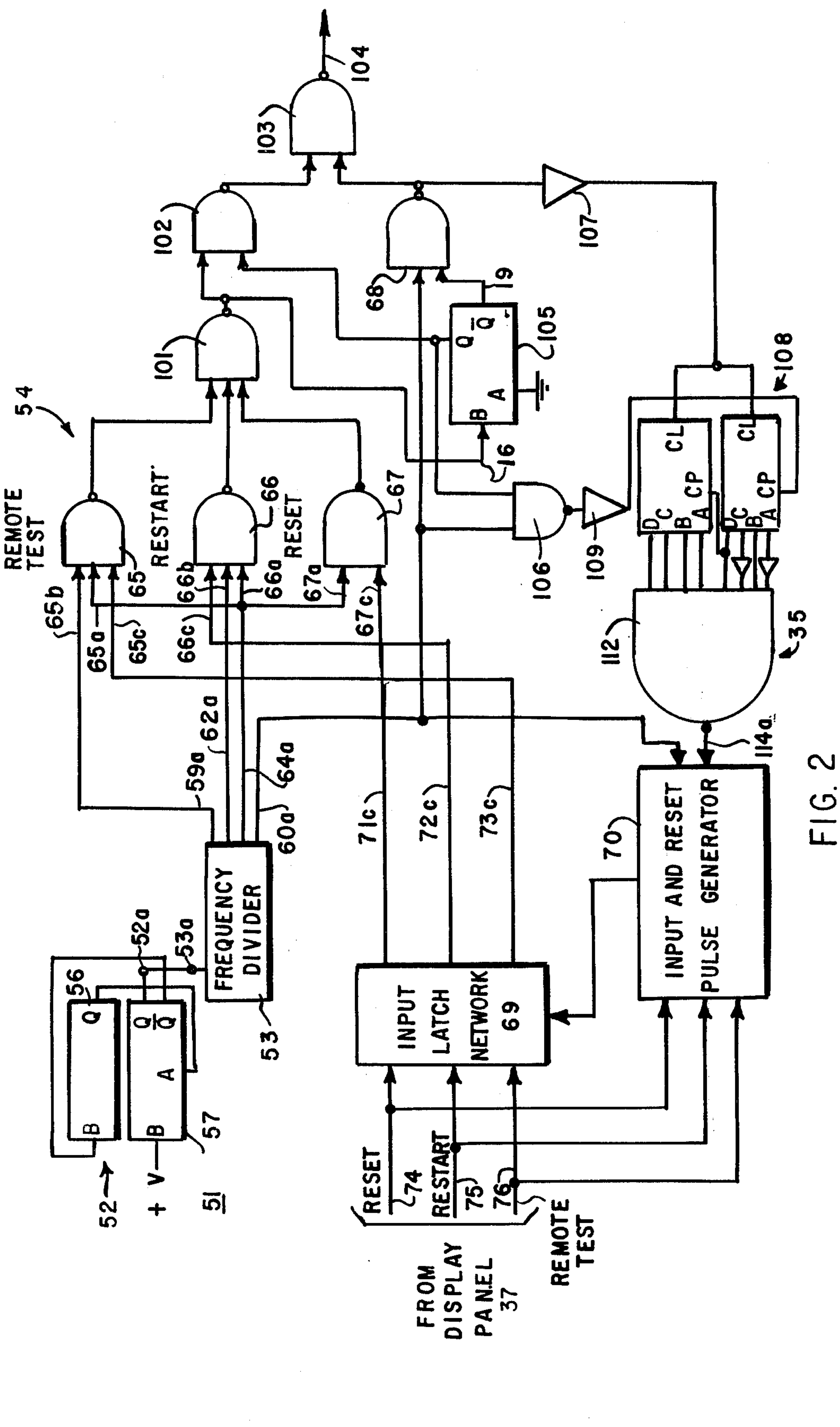
FIG. 2 is a partial block and schematic representation of a command generator employed in the monitor receiver shown in FIG. 1.

Referring to FIG. 2, there is shown a partial block and schematic diagram for the command generator 31. The command generator 31 includes a time base generator 51, including a clock pulse generator 52 and a frequency divider circuit 53, which provide timing signals for gate circuits 54 which formulate the command signals. The timing diagram for the time base generator 51 is shown in FIG. 6. The clock pulse generator 52 is comprised of two tandem connected Jk flip flops 56 and 57 which provide a one-half millisecond symetrical pulse train shown, in line A of FIG. 6, at an output 52*a* there of which is connected to an input 53*a* of the frequency divider circuit 53.

Figure 3:
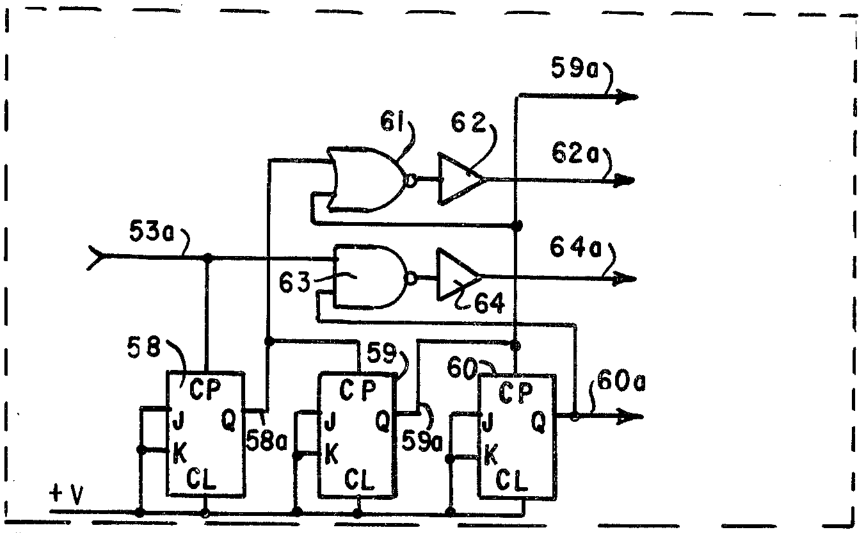
FIG. 3 is a schematic representation of a frequency divider circuit employed in the command generator shown in FIG. 2.

Referring to FIG. 3, the frequency divider circuit 53 is comprised of three Jk flip fops 58, 59 and 60, each of which provide a divide by two function, providing pulses at 1, 2, and 4 millisecond rates, respectively, (FIG. 6, lines B-D), and gate circuits 61–64 which combine the outputs of the frequency divider stages 58–60 to provide the output wave form shown in lines F and E, respectively of FIG. 6.

The outputs of divider stages 58 and 59 are extended to inputs of gate 61, which together with an inverter 62, provides an OR operation providing a 4 millisecond pulse followed by a 1 millisecond interval (FIG. 6, line F) at an output 62*a* thereof.

Gate 63 and associated inverter 64 provide an AND function, combining the output 53*a* of the pulse generator 52 and output 60*a* of divider stage 60 to provide four, one-half millisecond pulses followed by a four millisecond interval (FIG. 6, line E) at output 64*a*. The wave forms shown in FIG. 6 are continuously generated by the time base generator 51 as long as power is applied to the circuit.

Referring again to FIG. 2, the outputs 62*a* and 64*a* of inverters 62 and 64, and the output 60*a* of the frequency divider stage 60 are connected to inputs of gate circuits 65–68 which formulate and pass the command signals under the control of an input latch network 69. The input latch network 69 is responsive to manual commands provided by operating the mode select switches 37*a*–37*c* on the display panel 37 (FIG. 1) to provide enabling signals for one of the gates 65–67 to select operating modes for the system other than the normal mode. In the exemplary embodiment, the mode select switches 37*a*–37*c* are self-restoring push buttons, and accordingly, the input latch network 69 stores the command until the required command signal can be generated by the command generator 31. The input latch network 69 permits selection of the command requested and returns the system to the normal operating mode after a predetermined interval.

Figure 4:
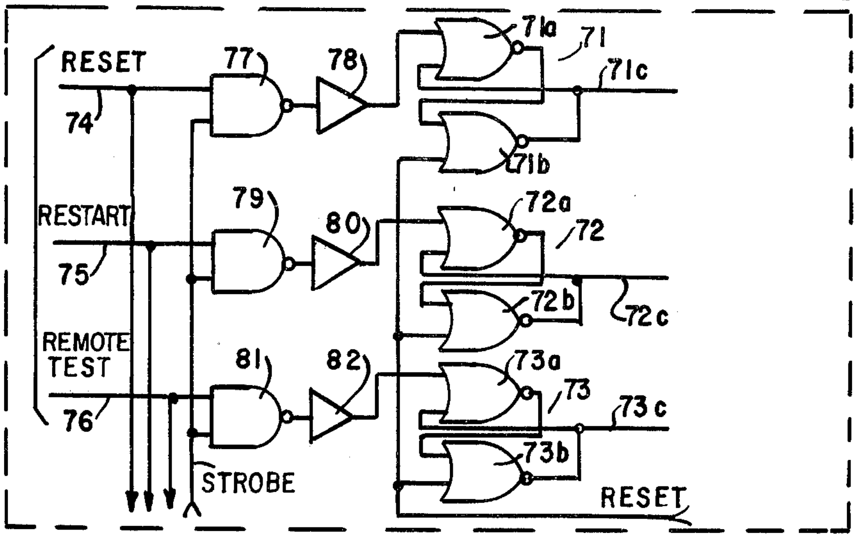
FIG. 4 is a schematic representation of an input latch network employed in the command generator shown in FIG. 2.

Referring to FIG. 4, there is shown a schematic representation of the input latch network 69. The input latch network 69 comprises flip flops 71–73 which store the restart, reset and remote test initiation signals provided through operation of mode select switches 37*a*–37*c*. Each of the flip flops 71–73, such as flip flop 71, is comprised of a pair of NOR gates 71*a* and 71*b*. The flip flops 71–73 are selectively set in response to an initiation signal provided over corresponding inputs 74–76 of the input latch circuit 69. Input line 74 is connected to the reset mode select switch 37*b* and goes to a logic one level to enable flip flop 71 to be set whenever the switch 37*b* is operated. Input lines 75 and 76 are connected to the restart and remote test mode select switches 37*a* and 37*c*, respectively, to enable flip flops 72 and 73 to be set upon command. A NAND gate 77 and an inverter 78, which are interposed between the line 74 and the set input of flip flop 71, form an AND circuit to buffer the actual switch contact from the flip flop 71 and to enable the flip flop 71 to be set in response to a strobe signal provided by the input and reset pulse generator 70. Buffer gates 79–82 provide a similar function for flip flops 72 and 73, respectively.

Figure 5:
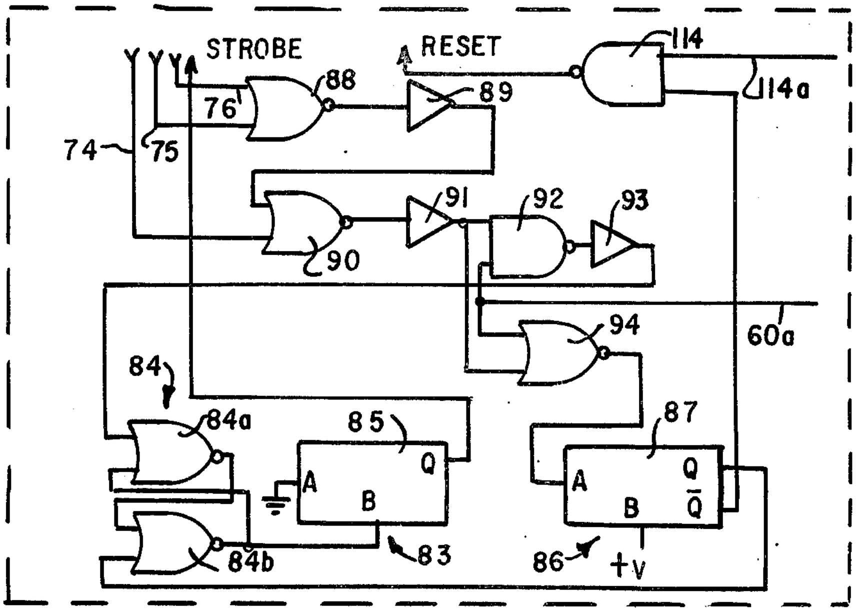
FIG. 5 is a schematic representation of an input and reset pulse generator employed in the command generator shown in FIG. 2.

Referring to FIG. 5, the input and reset pulse generator 70 includes a strobe pulse generator 83, which is comprised of a flip flop 84, and a monostable circuit 85 which provides an enabling signal for the buffer gates 77, 79 and 81 of the input latch network 69. The input and reset pulse generator 70 further includes a reset pulse generator 86 which is comprised of a monostable circuit 87, which effects reset of the flip flops 71–73 whenever any of the three command lines 74–76 ceases activity.

Control gates 88–94 of the input and reset pulse generator 70 logically combine the signals provided on command lines 74–76 and provide enabling signals for the strobe pulse generator 83 and the reset pulse generator 86. NOR gate 88 and associated inverter 89 provide an OR function for combining the signal on the restart and remote test lines 75 and 76 to provide an enabling signal over NOR gate 90 and inverter 91 which provide an OR function to provide an output whenever the status of any one of the three input command lines 74–76 changes. Gate 92 and associated inverter 93 perform and AND function, combining the output of inverter 91 and of divider stage 60 of the frequency divider circuit 53 to provide an output for enabling the strobe pulse generator circuit 83, but only when the outputs of stage 60 of the frequency divider circuit 53 and of the inverter 91 are at a logic 1 level.

The flip flop 84 which may be implemented by a pair of NOR gates 84*a* and 84*b*, is responsive to an output provided by inverter 93 whenever a status change occurs on one of the command input leads 74–76 to trigger the monostable circuit 85 which provides a 50 microsecond strobe pulse to the command input buffer gates 77, 79 and 81, permitting the corresponding flip flops 71–73 to be set.

NOR gate 94 responds to outputs of inverters 91 and 93 to enable the monostable circuit 87 of the reset pulse generator 86 to provide a reset signal which is extended over gate 114 to the reset input of flip flops 71–73 when any of the input command switches are released, gate 114 assures that the reset signal is extended to flip flops 71–73 only if the command word formulation is complete. Gates 92 and 93 assure that the command generator 31 does not change modes, that is issue a different command word while a given command word is being formulated.

The command signal formulating gates 65–67 are responsive to outputs of the flip flops 71–73 and the time base generating circuit 51 to formulate the commands designated by the signal on one of the command input lines 74–76.

Referring to FIG. 2, gates 65 and 66 comprise three input NAND gates which formulate the remote test command signal and the restart command signal, respectively. Gate 67 comprises a two input NAND gate which formulates the reset command signal. Gates 65, 66 and 67 have respective inputs 65*a*, 66*a* and 67*a* connected to the output 64*a* of inverter 64 to receive the output wave form shown in line E of FIG. 6. Gate 65 has a second input 65*b* connected to output 59*a* of counter stage 59 to receive the two millisecond pulses shown in line C of FIG. 6. Gate 66 has a second input 66*b* connected to output 62*a* of inverter 62 to receive the four millisecond pulses shown in line F of FIG. 6. In addition, gates 65, 66 and 67 have respective inputs 65*c*, 66*c* and 67*c* connected to outputs 73*c*, 72*c* and 71*c*, respectively of command latch circuits 73, 72 and 71.

Gate 65 is enabled whenever latch 73 is set to provide two one-half millisecond pulses at a one-half millisecond interval which is repeated every 8 milliseconds. Gate 66 is enabled whenever latch 72 is set to provide the restart command signal which consists of 3½ millisecond pulses at ½ millisecond intervals which is repeated at every 8 milliseconds. Gate 67 is enabled whenever latch 71 is set to provide the reset command signal which consists of 4½ millisecond pulses at ½ millisecond intervals which is repeated at every 8 milliseconds. The normal command signal, which is provided at output 60*a* of divider stage 60 consists of a four millisecond pulse followed by a 4 millisecond interval, which is repeated every 8 milliseconds.

The command signals provided by gates 65–67 are extended over gates 101, 102 and 103 to the line driver 32 and the decoder steering network 34 (FIG. 1). In addition, clock pulses at the four millisecond rate for the normal mode of operation are extended from the output 60*a* of counter stage 60 and over a gate 68 to gate 103. Gate 101 serves as an OR gate to extend the outputs of gates 65–67 to an input of a NAND gate 102 which receives an enabling input from a hold off timer 105. The output of gate 102 is extended over gate 103, which is operable as an OR gate to enable the command signal to be extended to the line driver 32 and the decoder steering network 34. Gate 68, is normally enabled to pass the 4 millisecond clock pulses to the line driver 32 and the decoder steering network 34 over gate 103. Whenever a remote test command, restart command, or a reset command is provided over gates 65–67 and 101, gate 68 is inhibited by the hold off timer 105 to prevent the normal clock pulses from being transmitted to the line driver and the decoder steering network 34.

The hold off timer 105 comprises a monostable circuit which is enabled whenever an output is provided by gate 101 for enabling gate 102 and disabling gate 68. The hold off timer 105 assures that a complete word is formed before the mode of operation of the command generator is changed.

For the purpose of defining an operating interval for the command generator before reset of the input command latches 71–73 is effected, the output of gate 68 is extended over an inverter 107 to an input of a binary counter 108. The counter 108, which is comprised of two tandemly connected binary counter stages, is stepped by a clock pulse provided over gates 106 and 109 whenever a command other than the normal command signal is being issued. In the exemplary embodiment, the counter 108 is capable of providing a count of 256 before recycling, and since the system operates on an 8 millisecond cycle time, a two second interval be approximated by the counter 108. It is apparent that in some application it may be desirable to employ a counter which provides a count greater than 256 to accommodate different cycle times for the system. The output of the counter 108 is decoded by a decoding gate 112 which is enabled whenever the counter reaches a count of 250. Gate 112 provides a further enabling input to gate 114 over line 114*a* to effect reset of the input latch circuits 71–73 at the end of the two second interval defined by the counter 108.

Decoder Steering Network

Figure 7:
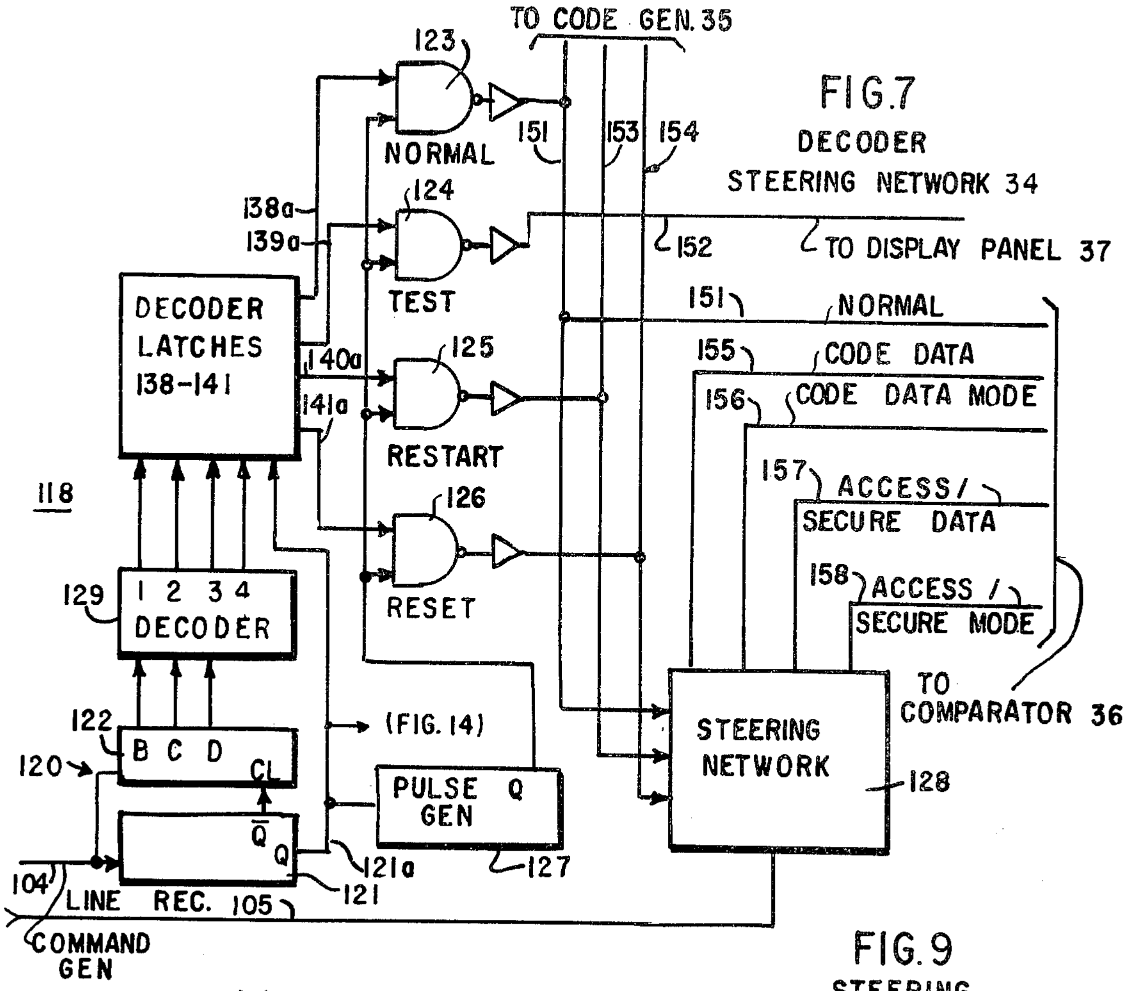
FIG. 7 is a partial block and schematic circuit diagram for a decoder steering network employed in the monitor receiver shown in FIG. 2.

Referring to FIG. 7, there is shown a block diagram of the decoder steering network 34. The decoder steering network 34 includes a decoder 118 which responds to the command signal supplied over line 104 from the command generator 31 to steer a pulse to one of three command lines 151, 153 and 154 which extend to the code generator 35 or over command line 152 to the display unit 37. In addition, command lines 151, 153 and 154 are extended to the steering network 128 which also receives the incoming data from the transmission line 40 to permit gating of the data to the comparator circuit 36.

Figure 8:
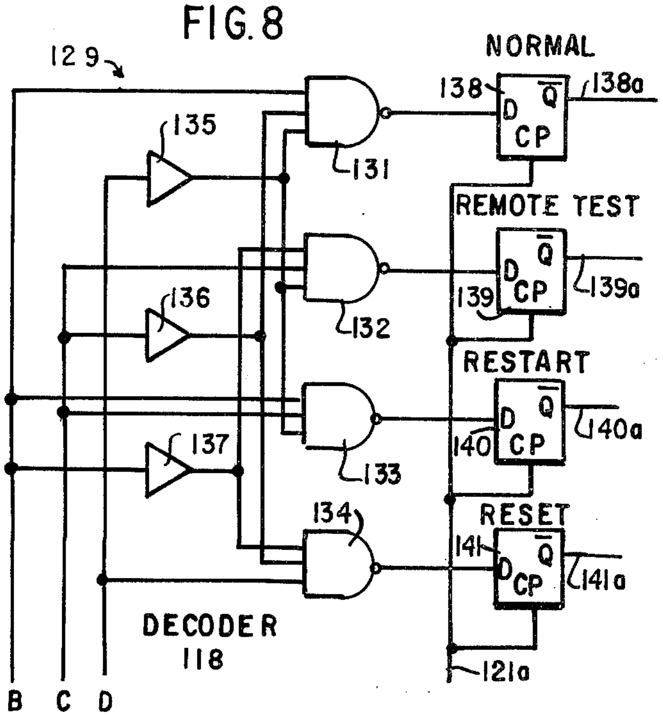
FIG. 8 is a schematic representation of a decoder employed in the decoder-steering network shown in FIG. 7.

As indicated above, during the 8 millisecond cycle time of the system, a normal command is represented by one pulse within a given 4 millisecond period, the remote test command is represented by two pulses within a 4 millisecond time, the restart command signal is represented by three pulses within a given four millisecond time and the reset command signal is represented by four pulses within a given four millisecond time. The counter 120 includes a monostable circuit 121 which produces a 4 millisecond pulse upon command from the command generator 31. The counter 120 further includes a three stage binary pulse counter 122 which counts the number of pulses issued by the command generator 31 during the four millisecond interval defined by monostable circuit 121. The outputs of the pulse counter 122 are decoded by a decoder network 129, shown in detail in FIG. 8, which is comprised of four three input NAND gates 131–134 and inverters 135–137. The decoder gates 131–134 provide data outputs which control the state of four flip flops 138–141 each of which is associated with a different command. Flip flop 138 is set in response to a normal command, flip flop 139 is set in response to a remote test command, flip flop 140 is set in response to a restart command, and flip flop 141 is set in response to a reset command. For example, when the system is operating in the normal mode, gate 131 is enabled once during each 8 millisecond period to provide a pulse indicative of the normal mode at the data input of latch 138. The pulse is clocked into latch 138 by the output of the monostable circuit 121 at the end of the 4 millisecond time period.

A pulse generator 127 is responsive to the output of the monostable circuit 121 to provide a 1 millisecond pulse at the end of 4 millisecond period defined by monostable circuit 121. Gates 123–126, each of which have a respective inputs commonly connected to the output of the pulse generator 127, have respective inputs connected to the outputs 138*a*–141*a* of the latch circuits 138–141 and are selectively enabled as a function of the state of the latch circuits 138–141 to gate the 1 millisecond pulse provided by the pulse generator 127 to one of the command lines 151–154.

Figure 9:
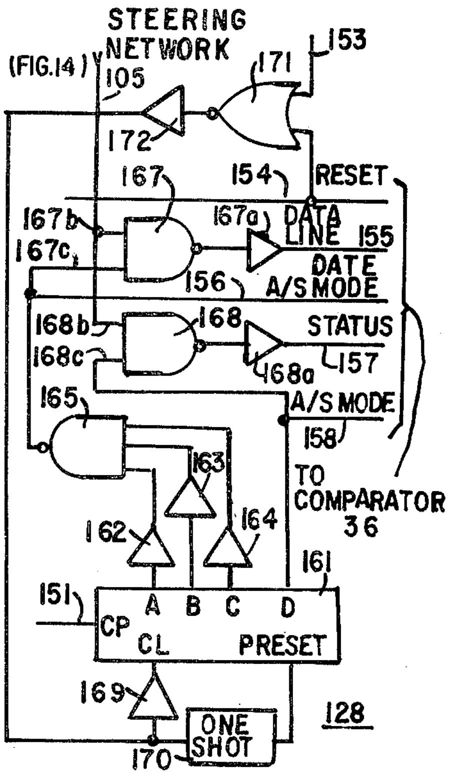
FIG. 9 is a schematic representation of the steering network employed in the decoder-steering network shown in FIG. 7.

Referring to FIG. 9, there is shown a schematic representation of the steering network 128. As indicated above, in the exemplary embodiment, the zone monitor 20 transmits line security code and access secure status data during four time slots which are defined by the data selection network 24 (FIG. 1), the line security code bits being transmitted during the first three time slots and the access secure status bit being transmitted during the fourth time slot. The steering network 128 includes steering gate 167 which over inverter 167*a* steers the three bits of the line security code to line 155 which is extended to the comparator 36. Similarly, gate 168 steers the access secure status bit over inverter 168*a* and line 157 to the comparator 36. In addition, the steering network 128 provides a signal over line 156 or 158 to indicate that the received bits correspond to the line security code or the access secure bit, respectively. Gates 167 and 168 each comprise a two input NAND gate having respective inputs 167*b* and 168*b* commonly connected over line 105 to the output of the line receiver 33. Second inputs 167*c* and 168*c* for gates 167 and 168 receive enabling inputs provided by a shift register 161 and associated gating circuits 162–165. The shift register 161 comprises a four stage parallel-in, parallel-out shift register with preset capabilities so that upon receiving a preset command, the shift register 161 loads a four-bit word 1000.

The shift register 161 is normally cycled by the normal command signal provided on line 151 which is connected to the clock input of the shift register 161. Accordingly, whenever the system is operating in the normal mode so that normal command signals are provided on line 151, the logic one level signal stored in the first stage of the shift register 161 is shifted from the first stage to the last stage providing a logic one level signal over outputs A-D of the shift register 161. Outputs A-C are connected over inverters 162–164 to different inputs of a NAND gate 165 the output of which is connected to an input of 167*c* of gate 167 and to line 156. Output D of shift register 161 is connected to an input 168*c* of gate 168 and to line 158. Gate 165 operates as a three input OR gate to logically combine outputs A-C of the shift register 161 to enable gate 167 for the first three clock pulses to enable the first three bits of the received code to be gated over line 155 to the comparator 36. When the fourth normal command signal, or clock pulse, is provided, gate 168 is enabled while gate 167 is disabled to permit the access secure status bit to be gated over line 157 to the comparator 36.

Code Generator and Control Network

Referring to FIG. 10, the code generator and control network 35 includes a control network 183, a working code generator 181, a reset code generator 182, and a preset data network 185. The control network 183 receives the commands provided by the command generator 31 and extended to the code generator and control network 35 by the decoder steering network 34 over lines 151, 153 and 154. When the system is operating in the normal mode, the control network 183 provides clock pulses to the clock input CP of the working code generator 181 for enabling the code generator 181 to produce the pseudo-random code at output QH thereof for comparison with the identical code generated at the zone monitor 20. The reset code generator 182, which has outputs QA-QH connected to data inputs DA-DH of the working code generator, supplies a new starting word to the working code generator 181 in response to a restart command provided over control network 183. In response to a reset command, the control network 183 enables a preset data word stored in the preset data network 185 to be loaded into the reset code generator 182, which has data inputs DA-DH connected to outputs S1-S8 of the preset data circuit 185.

Referring to FIG. 11, there is shown a schematic representation of the code generator and control network 35. In the exemplary embodiment, the working code generator 181 comprises an 8 stage parallel-in, parallel-out shift register 191, such as the type SN74198, commercially available from Texas Instruments, Inc., and associated feedback circuits 192, which generates different pseudo-random sequences under the control of the feedback logic circuits 193–197. The exclusive OR gates 193–197 have inputs D11-D16 which are connected to any 8 of the outputs QA1-QH1 of the shift register 191. The output D19 of the feedback circuits 192 is connected to the serial input terminal of the shift register 191 constituting the working code generator. The normal command line 151 is connected to the clock input CP of shift register 191, and accordingly, as successive clock pulses are received over line 151, the bits stored in the shift register 191 are sequentially shifted from stage to stage providing a different pseudo-random code word over outputs QA1-QH1 of the shift register 191 is extended to the comparator circuit 36 and with successive clock pulses provided to the shift register 191, a pseudo-random sequence is provided over output QH1.

The reset code generator 182 comprises a shift register 198 which is identical to shift register 191 having outputs QA-QH connected to data inputs DA-DH, respectively of the shift register 191. The reset code generator also has associated exclusive OR feed back logic 199, including exclusive OR gates 201–205 which have inputs D1-D6 connectable to any 8 of outputs QA-QH of the shift register 198. The data inputs DA-DH of shift register 198 are connected to switches S1-S8 which comprise the preset data circuit 185. The switches S1-S8 are selectively operable to connect ground or plus 5 v to the data inputs DA-DH of shift register 198 to provide a preset data word for the reset generator 182 which is loaded into shift register 198 upon command. The shift register 198 is cycled whenever the restart push button 37*a* is operated to provide pseudo-random code words. Although the shift registers 191 and 198 are identical, feedback connections provided by associated feedback circuits 192 and 199 may not be identical, and accordingly the resultant sequences provided by the shift registers 191 and 198 may be different.

The working code generator 181 is sequenced and responds to clock pulses provided over line 151 from the decoder and steering network 34 to normally a pseudo-random sequence which is extended to the comparator circuit 36.

Restart or reset functions are effected in response to commands provided over lines 153 and 154 to the control network 183 which provides the required control signals for the working code generator 181 and the reset code generator 182. The control function being called for on control lines 153 and 154 is performed on the leading edge of the received clock pulse. However, due to internal propogation times, the NAND lines to the code generators must be at the desired state before the leading edge of the clock pulse. Accordingly, the control network 183 includes a delay circuit including an inhibit gate 213 and a flip flop 214, which is shown implemented by a pair of NOR gates 214*a* and 214*b*.

When a restart or reset command are received over respective lines 153 and 154, each restart signal is extended over inverter 211 and gate 212, which functions as an OR gate to set flip flop 214. Similarly, each reset signal is extended over gate 213, whenever gate 213 is enabled and over OR gate 212 to set flip flop 214. Gate 213 is controlled by an inhibit circuit 217 to inhibit the first reset pulse in a series of reset pulses from reaching the clock line for the reset code generator 181 thereby delaying the setting of flip flop 214 until gate 213 is enabled by inhibit circuit 217. The flip flop 214 when set by the output of gate 212 controls the load command line 220 for shift register 191 of the working code generator 181.

The inhibit circuit 217 is comprised of a flip flop 219 and a counter 218 which counts the number of clock pulses in the clock time interval to interpret whether the command is a reset, restart or remote test command. Flip flop 219 is set by the reset command provided over line 154 to provide an output for enabling a one shot circuit 224 to provide 50 microsecond pulse to clear the counter 218. The counter 218 is comprised of two Jk flip flops 218*a* and 218*b*. Flip flop 218*a* has an output connected to an input of gate 213 to normally inhibit gate 213 to prevent the first reset pulse from setting flip flop 214. Gate 226 compares the outputs of flip flops 218*a* and 218*b* and inhibits the output of flip flop 218*a* from advancing when the outputs of the two flip flops 218*a* and 218*b* are at logic one levels. The output Q of flip flop 218*b* is connected to the load line 230 for shift register 198 of the reset code generator and enables the preset date word provided by preset data circuit 185 to be loaded into the shift register 198.

Gates 231–235 form a descrete monostable flip flop which is responsive to the clock signals provided over the normal command line 151 to produce a 50 microsecond pulse for each input signal for resetting flip flops 214 and 219 upon receipt of a normal command from the steering network 34.

Comparator

Figure 12:
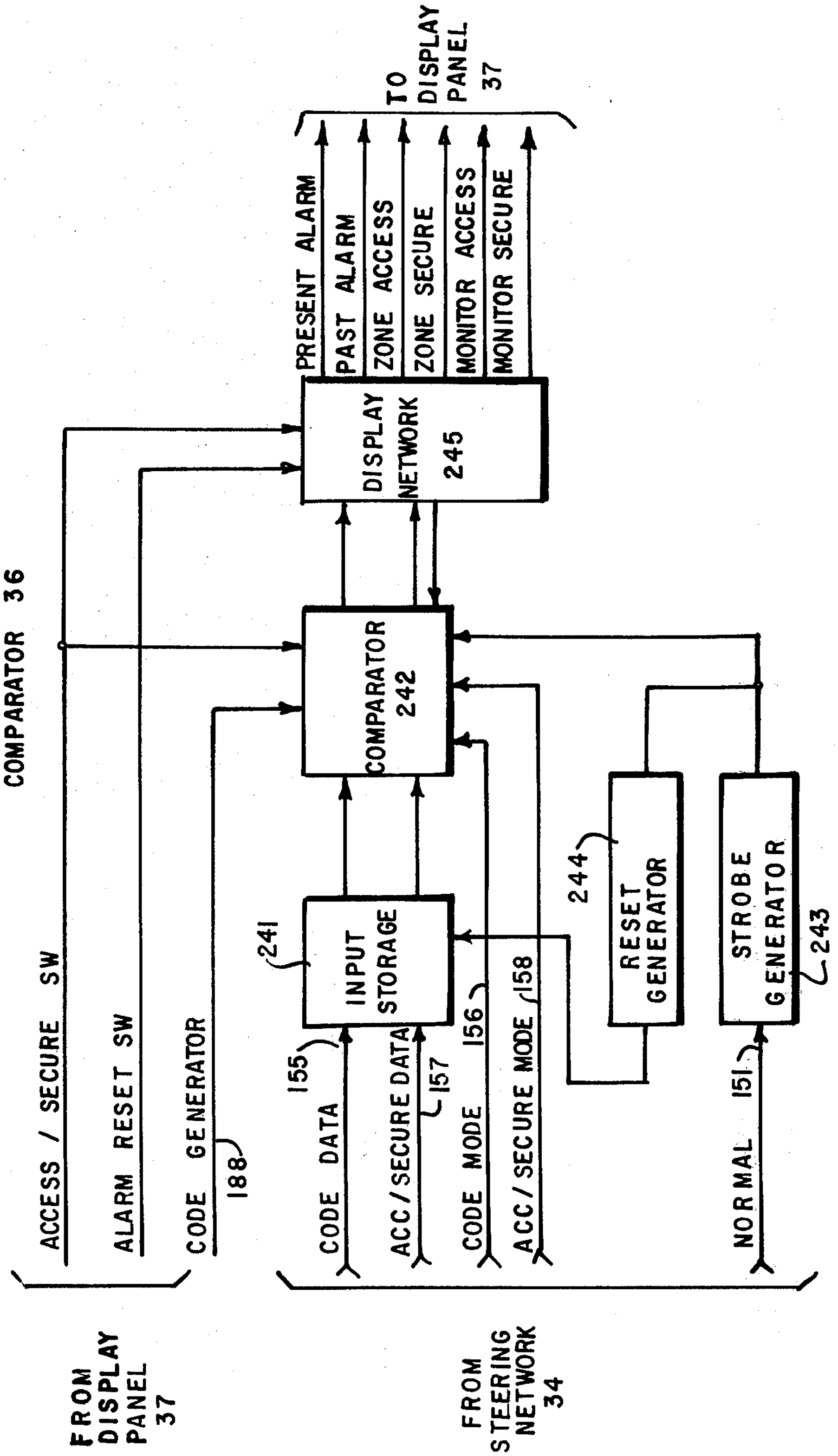
FIG. 12 is a block diagram of a comparator circuit employed in the monitor receiver shown in FIG. 2.

Referring to FIG. 12, there is shown a block diagram of the comparator 36. The comparator 36 includes an input storage circuit 241 which receives the line security code bits and the access/secure data bit over lines 155 and 157, respectively, from the decoder steering network 34 and stores the data until it is compared with the bits of the reference code provided by reference code generator 35, and access/secure status provided at the receiver monitor 30 by way of an access/secure status switch 37*d* located on the display panel. The comparator 36 includes a comparator circuit 242 which receives the information from the input storage circuit 241 and from the reference code generator 35 over line 188 and the access/secure switch 37*d* located on the display panel. In addition, the operating mode data (i.e. line code or A/S code), provided over leads 156 and 158 from the steering network is also extended to the comparator circuit 242. The comparator 36 further includes a strobe generator 243 for enabling the actual comparison to be made in the comparator circuit 242, and a reset generator 244 for resetting the input storage circuits 241 after the data has been transferred to the comparator circuit 242. The comparator circuit 242 provides suitable outputs indicating the status of the comparison, which are extended over the display network 245 and the display panel 37 for visually indicating alarm status conditions.

Figure 13:
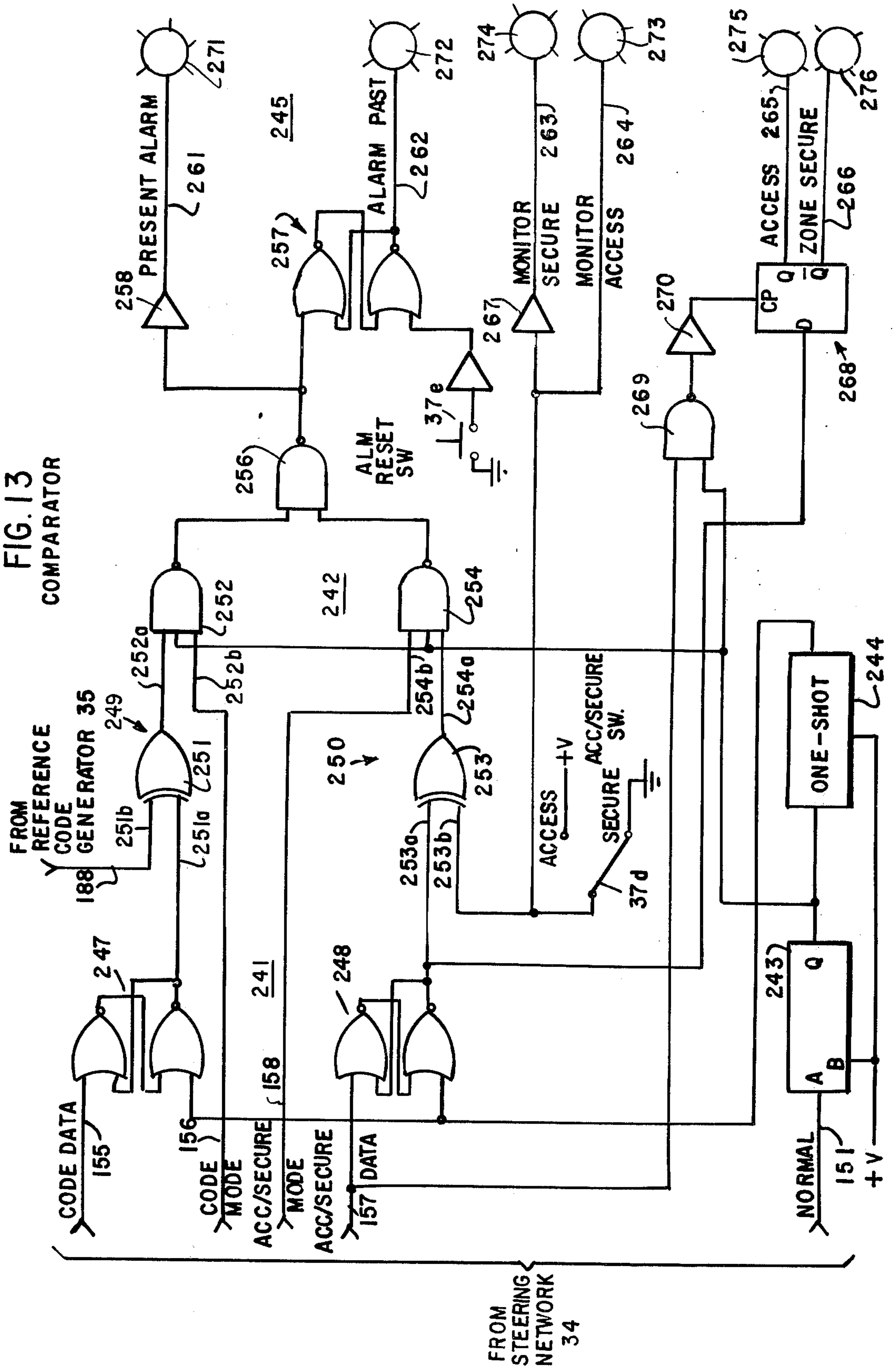
FIG. 13 is a schematic representation of a comparator circuit shown in FIG. 12.

Referring to FIG. 13, the input storage circuit 241 comprises a pair of set reset flip flops 247 and 248, each shown implemented by a pair of NOR gates. Flip flop 247 stores the line security code data received from the zone monitor 20 until the data is processed by the comparator circuit 242. Flip flop 248 stores the zone access/secure switch status data until the data has been processed. The comparator circuit 242 includes separate comparator circuits 249 and 250 for the line security code and the access/secure data, respectively. Comparator circuit 249 includes an exclusive OR gate 251 and a three input NAND gate 252. Comparator circuit 250 includes an exclusive OR gate 253 and a three input NAND gate 254.

Exclusive OR gate 251 has an input 251*a* connected to an output of flip flop 247, and an input 251*b* connected to line 188 which is connected to the output of the reference code generator 35. The output of gate 251 is connected to one input 252*a* of NAND gate 252 which has second input 252*b* connected to line 156 to receive the code mode signal provided by the steering network 34. Comparator circuit 242 compares each bit of the received line security code with the corresponding bit of the reference code.

Gate 253 has a first input 253*a* connected to the output of flip flop 248 and a second input 253*b* connected to the access/secure switch 37*d*, which is located on the display panel 37. The output of gate 253 is connected to an input 254*a* of gate 254 which has a second input 254*b* connected to line 158 to receive the access/secure mode signal provided by the steering network 34. Exclusive OR circuit 253 compares the access/secure data provided from the zone monitor with the condition of the access/secure switch 37*d* on the display panel 37 and provides an alarm output over gate 254.

Whenever the codes are not identical, gate 252 is enabled when a strobe signal for gates 252 and 254 is provided by the strobe pulse generator 243, which is comprised of a one shot circuit which produces a 50 microsecond pulse. The strobe pulse generator 243 is enabled by the normal command signal extended over lead 151 from the steering network 34. The strobe pulse generator 243 also enables the reset pulse generator 244, which may be comprised of a one shot circuit, which provides a pulse for resetting the flip flops 247 and 248 after the strobe pulse has been provided.

Gates 252 and 254 pass or inhibit the output of the comparator circuits 249 and 250 to a gate 256 as instructed by the decoder steering network 34. Gate 256 comprises a two input NAND gate operable to provide an OR function to extend the outputs of gates 252 and 254 to the display network 245. The output of gate 256 is extended over an inverter 258 of the display network to an alarm indicator 271, embodied as a light emitting diode, on the display panel 37. A logic one level output of gate 256 indicates an alarm condition and the light emitting diode 71 is energized in response by the logic zero level provided over inverter 258 whenever the compared codes are not identical.

The display network 245 includes a flip flop 257 which is set by each alarm signal provided by gate 256 to permit latching of the alarm indication. Flip flop 257 drives a light emitting diode 272. An alarm reset switch 37*e* which is located on the display panel 37, enables manual reset of flip flop 257.

The status of the access/secure switch 37*d* which is located on the display panel 37 is extended to a "monitor access" lead 264 to a light emitting diode 273 on the display panel 37 and over an inverter 267 to a "monitor secure" lead 263 to a further light emitting diode 274.

The display network 245 further includes an access/secure data latch circuit 268, which stores the access/secure status bit received from the zone monitor 20. A NAND gate 269 and associated inverter 270 provide an AND function to combine the logic level on the access/secure data line 157 and the strobe pulse provided by strobe pulse generator 243 such that for every fourth data pulse received from the zone monitor 20, the status of the zone access/secure switch is gated into the latch circuit 268 which stores the status of the zone access/secure switch and passes the information to the display panel 37 over leads 265 and 266, to control the energization of respective light emitting diodes 275 and 276.

Line Driver-Line Receiver

Referring to FIG. 14, there is shown a schematic representation of the line driver 32 and the line receiver 33 for the receiver monitor 30. In order to provide immunity to common mode noise, a balanced line drive is provided through the use of differential mode data transmission. The line driver 32 includes a line driver circuit, such as the National Semiconductor Type DM8831. The output of the command generator 31 at gate 103, FIG. 2, is extended over lead 104 and gate 291 to an input of the line driver circuit 290. The output of the line driver circut 290 is connected to the transmission line 40.

The line receiver 33 includes a National Semiconductor Type DM8820 line receiver circuit 292, the input of which is connected to the line 40, and the output of which is connected over an inverter 293 to an input of a two input NAND gate 294, the output of which is connected over an inverter 295 and lead 105 to the input of the steering network 128, FIG. 9.

The line receiver circuit 292 is continuously on and gate 294, which is strobed by a strobe pulse generator 296, prevents unwanted information from being received by the monitoring receiver 30. The line driver circuit 290 is transmitting continuously except for the short period of time when data is being received from the protected area 11 during which time a strobe signal provided by strobe signal generator 296 over line 301 inhibits the line driver circuit 290.

The strobe signal generator 296 is comprised of monostable circuit which provides a 2 millisecond strobe pulse for enabling gate 294 and for inhibiting the line driver circuit 290. The strobe pulse generator 296 is controlled by the decoder timing circuit 121, FIG. 7.

DETAILED DESCRIPTION OF ZONE MONITOR

Figure 15:
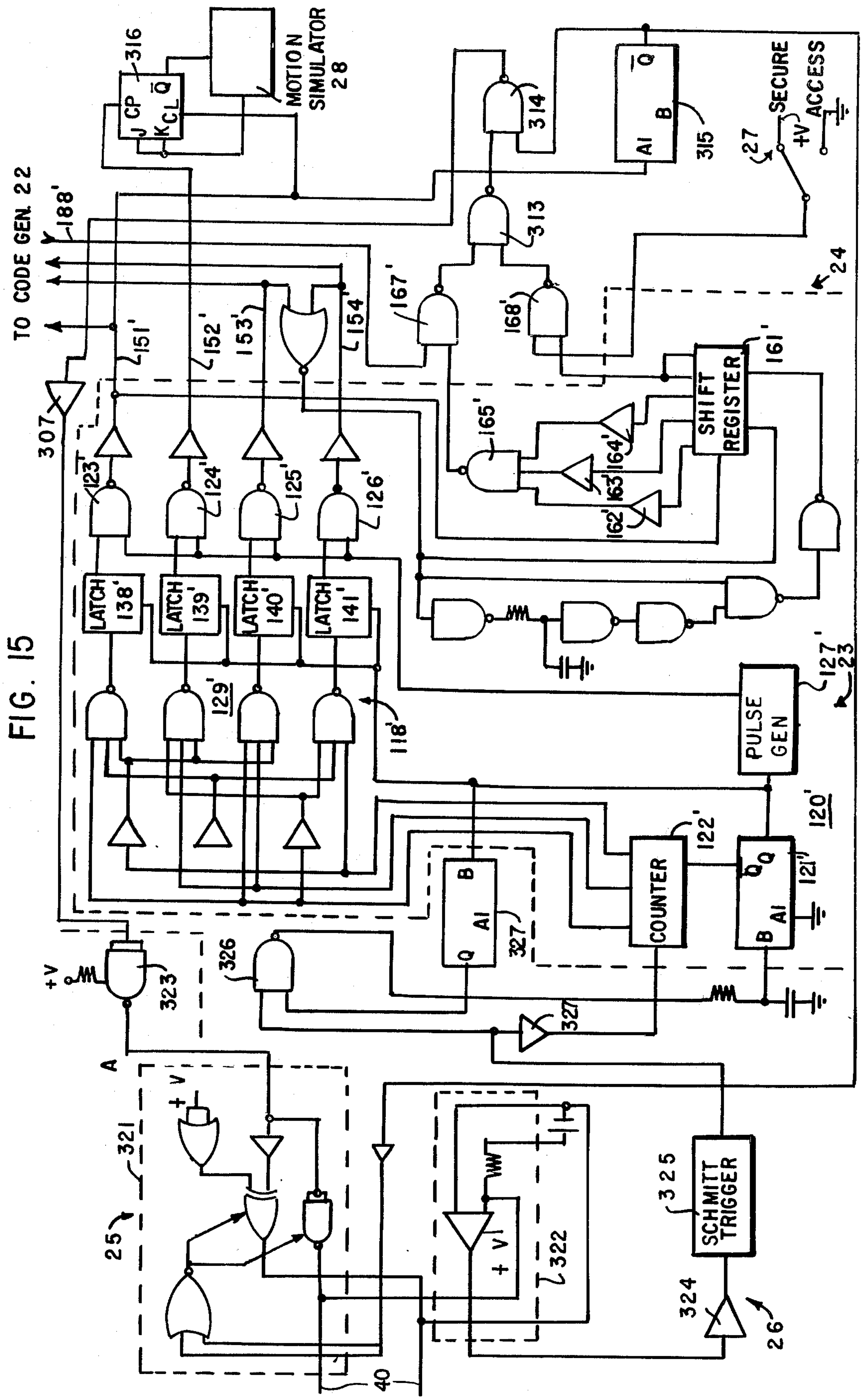
FIG. 15 is a schematic representation of portions of the zone monitor shown in FIG. 1.

Referring to FIG. 15, there is shown a schematic representation of portions of the zone monitor 20 including the decoder steering network 23, the data selection network 24, the line driver 25 and the line receiver 26. The code generator 22 is not shown in detail inasmuch as the code generator 22 is identical to the code generator 35 of the monitoring receiver as shown in FIG. 11. The code generator 22 of the zone monitor 20 includes a working code generator, a preset data circuit and a control network which provide the functions of the code generator and control network shown in FIG. 11. It is pointed out, the working code generators as well as the reset code generators in both the monitoring and secured areas operate in sychronism to produce identical pseudo-random code sequences. In addition, the preset data networks in the monitoring and the secured areas provide identical starting words for the reset code generators.

The code generator 22 of the zone monitor 20 is operable to produce the pseudo-random line security code in response to the command signals transmitted over the transmission line 40 from the monitor receiver 30. The command signals as received by the line receiver 26 are extended to the decoder steering network 23 which provides suitable control signals for the code generator 22 and the data selection network 24.

Decoder Steering Network

The decoder steering network is also similar to the decoder steering network 34 of the monitor receiver 30. Accordingly, elements of the decoder steering network 23 which correspond to like elements of the decoder steering network 34 of the monitor receiver 30 will be given a prime notation.

The command signals provide at the output of the line receiver 26 are extended to the input of counter 120′ and decoded by the decoder-latch network 129′ to provide enabling inputs for steering gates 123′–126′ for gating the 1 millisecond pulse provided by pulse generator 127′ to one of the command leads 151′–154′ which extend to the code generator 22. The decoding and steering functions are identical to those disclosed above with reference to the decoder steering network 34 of the monitor receiver 30. During the normal operating mode, the code generator responds to the normal command signals to generate the pseudo-random code which is returned to the data selection gates 167′ and 168′ which are controlled by the data selection circuit including shift register 161′ and gates 162′–165′ to gate 3 bits of a line security code to the line driver over an OR gate 313 during a first 3 time slots defined by shift register 161′ and to gate the status of the access/secure switch 27 at the zone monitor to the line driver over the OR gate 313 during the fourth time slot defined by the shift register 161′.

In the event a reset or a restart command is issued by the command generator 31 of the receiver monitor 30, such commands will be steered to the code generator 22 over command lines 153′ and 154′ to effect the reset or restart of the working code generator and the reset code generator in the manner described above. In the event a remote test command is received, such command is extended over lead 152′ to effect the setting of a JK flip flop 316 which in turn enables a motion simulator to test the operation of the intrusion sensor employed in the secured area.

In the event of an alarm condition, a code complementor circuit effects the complementing of all the bits of the line security code provided by code generator 22. Referring to FIG. 16, the complementor circuit may be comprised of an exclusive OR gate 317 which has a first input 317*a* which is connected to the output of the code generator 22, a point corresponding to the lead 188 for the code generator shown in FIG. 11, and a second input connected to the output of the alarm sensor of the alarm source 21. Accordingly, in the event of an alarm condition, the complemented bits provided by code generator 22 of the zone monitor 20 will fail to compare with the code bits generated by the reference code generator 35 of the monitor receiver 35 permitting an alarm indication to be registered on the display panel 37. Referring again to the decoder steering network 23 and the data selection network 24, the access/secure switch 27 of the zone monitor 20 provides an input to gate 168′ for enabling transmission of the status of the access/secure switch 27 to the monitor receiver 30. As indicated above, gate 167′ enables transmission of 3 bits of the line security code provided by code generator 22. The outputs of gates 167′ and 168′ are extended to separate inputs of a NAND gate 313 which functions as an OR circuit to extend the outputs of gates 167′ and 168′ to a NAND gate 314 which responds to a strobe pulse provided by strobe pulse generator 315 to extend the output of gate 313 to the line driver over an inverter 307. Strobe pulse generator 315 comprises a one shot circuit which is triggered by each normal command pulse provided on lead 151.

Line Driver-Line Receiver

The line driver 25 and the line receiver 26 of the zone monitor 30 are generally similar to the line driver 32 and the line receiver 33, respectively of the receiver monitor 30. The line driver 25 includes a National Semiconductor Type DM8031 line driver 321 and the line receiver 26 includes a National Semicnductor Type DM8820 line receiver circuit 322. The output of the data selection network 25 at inverter 307 is extended over a gate 323 to the input of the line driving circuit 321, the output of which is connected to the transmission line 40.

The input of the receiver driving circuit 322 is connected to the transmission line 40, and the output of the line receiving circuit 322 is extended over an inverter 324 and a Schmitt trigger circuit 325 to an input of a gate 326, and over an inverter 327 to an input of counter 122′. The output of gate 326 is connected to the input of the monostable circuit 121′ of the decoder steering network 23. The Schmitt trigger circuit 325 is employed to eliminate false triggering of the decoder steering network 23 of the zone monitor 20 in response to noise pulses.

The receiver driving circuit 322 is continuously enabled to receive data from the transmission line 40. However, the output of the receiver driving circuit 322 is gated to the decoder steering network 24 over gate 326 only when a strobe pulse is provided by a strobe pulse generator 327 which is comprised of a monostable circuit which produces a 7.5 millisecond strobe pulse for enabling gate 326. Monostable circuit 327 is enabled by the output of the 4 millisecond pulse generator 121' of the counter 120'.

For the purposes of inhibiting the line driving circuit 321 when data is being transmitted by the zone monitor 20, the output of strobe pulse generator 315 is extended to an inhibit input of the line driving circuit 321.

With the line driver-line receiver arrangement for the zone monitor 20 and the monitor receiver 30, of the exemplary embodiment, the system may employ a transmission line of up to approximately 11 miles in length. The timing of the circuits may be adjusted to accommodate longer transmission lines. To provide further noise immunity as well as to compensate for transmission delays, the duration of the basic timing cycle may be increased, for example, to 16 milliseconds. Also, it is preferable that the transmission line be unloaded to minimize transmission delays.

A further method for compensating for transmission delay is to employ a synchonous operation, which employs a nonsymmetrical clock pulse, the duration of which is equal to the time duration of the longest system command that is employed. In such arrangement, data is returned to the system monitor receiver 30 in a two-bit word, the first bit being a start bit, and the second bit being the code bit. In such arrangement, the strobe pulse which gates the psuedo-random code bits from the code generator in the secured area into the comparison circuit 36 is adjusted so that it occurs within the duration of the code bit. The data pulse sent from the protected area could be lengthened to accommodate the maximum transmission delay anticipated, that is, the data pulse would be made equal to the sum of the maximum anticipated delay and the length of the strobe pulse. Thus, the strobe pulse would be generated at such time as to occur late near the end of the data pulse received from the secured area when the secured area is close to the monitoring, and near the start of the data pulse when the secured area is located at a maximum distance from the monitoring area. Employing such arrangement, the system could be adjusted to accommodate any length of line up to, for example, twenty miles.

OPERATION OF THE SYSTEM

For the purpose of illustrating the operation of the system it is assumed initially that the system is operating in the normal mode and that the code generators 22 and 35 in the secured area and the monitoring area are operating in synchronism.

Referring to FIGS. 2–6, the command generator continuously generates the normal, reset, restart, and remote test commands, and when the system is operating in the normal mode, the normal command, shown in line D of FIG. 6, which comprises a 4 millisecond pulse provided every 8 milliseconds is provided an output 60*a* of the frequency divider circuit 53 and extended over gate 68, which is enabled by the hold off timer 105, and over gate 103 and lead 104 to the decoder steering network 34 and to the line driver 32 for transmission to the zone monitor over the transmission line 40.

Referring to FIG. 7, the normal command signals provided over line 104 every 8 milliseconds cause counter 122 to be stepped once every 8 milliseconds providing an output over lead B which is decoded by the decoder 129 causing gate 131 to provide a data input to the decoder latch 138. The normal command signal also triggers the monostable circuit 121 which provides a 4 millisecond pulse. At the end of the 4 millisecond pulse provided by monostable circuit 121, the counter 122 is cleared, and a strobe pulse is provided over lead 121*a* to latch circuits 138–141, causing the data output of gate 131 to be latched in latch circuit 138 providing an enabling input for gate 123 (FIG. 7). The monostable circuit 121 also enables pulse generator 127 at the end of 4 millisecond period to provide a 1 millisecond pulse which is gated over gate 123 to the normal command line 151 which extends to the code generator 35 and to the shaft register 161 of the steering network 128 (FIG. 9).

Referring to FIG. 11, the normal command signal provided over lead 151 is extended to the clock input CP of shift register 191 of the working code generator 181, causing the bits of the shift register 191 to be shifted. With successive clock pulses (normal command signals) applied to the clock input CP of the shift register 191, a pseudo-random code is provided at output QH1 which is extended over line 188 to the comparator circuit 36.

The normal command signals are also extended to the line driver 32 and passed over gate 291 to the line driving circuit 290 and transmitted over the transmission line 40 to the zone monitor 20, shown in FIG. 15. The command signals are received by the line receiver 26 and extended to counter 122' which counts the number of pulses provided during each 4 millisecond period defined by monostable circuit 121' when enabled by an output of gate 326 of the line receiver 26. The outputs of counter 122' are decoded by the decoder 129', effecting the setting of decoder latch 138' at the end of the 4 millisecond period for providing an enabling input for gate 123' to pass the 1 millisecond pulse provided by pulse generator 127' to the normal command lead 151'.

Successive normal command signals extended to lead 151' are in turn extended to the code generator 22 to sequence the working code generator to provide the pseudo-random sequence which is identical to the reference code provided by reference code generator 35 in the monitoring area. When the protected area is secured, the code bits provided by code generator are identical to the code bits of the reference code generator 35 in the monitoring area. The line security code provided by code generator 22 is returned to the gate 167' of the data selection network 24. Each normal command signal provided on line 151' is extended to the shift register 161' the outputs of which are decoded over gates 162'–165' for enabling gate 167' to pass three bits of the line security code over gates 313 and 314 to the line driver 25. The normal command signal provided on line 151' also triggers strobe pulse generator 315 to provide a 1 millisecond strobe pulse for gate 314 in response to each normal command signal.

After 3 bits of the line security code have been transmitted, the next normal command signal steps the shift register 161' to enable gate 168' to pass the bit representing the status of the access/secure switch 27. In the illustrated embodiment, access/secure switch 27 is shown positioned to indicate a secure mode, and the access/secure status code bit is transmitted during a fourth time slot defined by shift register 161'.

The 3 bits of the line security code plus the bit representing the status of the access/secure switch 27 are extended to the line driver 25 and transmitted to the monitoring area over the tranmission line 40. Referring to FIG. 9, the code bits received from the secured area and passed over the line receiver 33 are extended over line 105 to gates 167 and 168 of the steering network 128. Shift register 161 is responsive to each normal command signal provided over command line 151 to shift the logic one level signal which is preset into the first stage of the shift register 161 to successive stages. The outputs of the shift register 161 are decoded by gates 162–165 to enable gate 167 to pass the first three bits of the line security code to line 155 which extends to the comparator 36. When the fourth normal command pulse is provided, gate 168 is enabled to pass the access/secure status bit to line 157 which also extends to the comparator 36.

Referring to FIG. 13, each logic one level bit of the line security code causes flip flop 247 to be set to provide logic one level input to exclusive OR gate 251 which receives the reference code provided by the reference code generator 35 at a second input thereof. Gate 251 provides a logic zero level whenever the compared bits are identical and logic one level whenever the compared bits are different. Thus, whenever the protected area and the transmission line 40 are secure, each bit of the line security code received is identical with the corresponding bit of the reference code so that gate 252 is disabled by the exclusive OR circuit 251 and no alarm is provided. For an alarm condition in the secured area, each bit of the line security code is complemented by the exclusive OR circuit, FIG. 16, which is interposed between the output of the working code generator and the data selection network 24. Accordingly, failure of the bits compared by exclusive OR circuit 251 to compare enables gate 252 to be enabled when the strobe pulse is provided by strobe pulse generator 243, providing a signal which is extended over gate 256 and inverter 258 to energize alarm indicator 271 for indicating the failure of the comparison for the bits being compared and thus that an alarm condition exists. Gate 256 also effects the setting of latch 257 for energizing alarm indicator 272 to indicate that at least one bit of the code sequence transmitted from the secured area failed to compare with reference code in the event of a return to normal condition for the secured area.

After the three bits of the line security code have been received and compared by the comparator circuit 249, the code mode line 156 returns to a logic zero level for inhibiting gate 252 and the access/secure mode line 158 goes to a logic one level providing an enabling input for gate 254 of comparator circuit 250. The access/secure data bit provided on line 157 causes flip flop 248 to be set whenever the bit is at a logic one level or to remain reset whenever the access/secure data bit is at a logic zero level. In the exemplary embodiment, where the access/secure switch 27 in the secured area is in the secure mode, and the access/secure switch **37*d* located on the display panel 37 is also set to the secure mode, exclusive OR circuit 253 disables gate 254, preventing an alarm from being indicated. However, monitor secure indicator 274 is energized to indicate the access/secure switch at the display panel 37 is operated to the secure position. Moreover, data latch 268 is set by the logic one level provided at the output of flip flop 248 energizing indicator 276 to indicate that the access/secure switch 27** at the secured area is set to the secure position.

When the access/secure switch 27 in the secured area is set to the access position while the access/secure switch **37*d* on the monitoring display panel is set to the secure position, the received code bit does not compare with the input to exclusive OR circuit 253 provided by access/secure switch 37*d*, causing gate 254 to be enabled to effect energization of alarm indicator 271 for indicating an alarm condition. In addition, the monitor secure indicator 274 is energized indicating the status of the access/secure switch 37*d* is the secure mode while indicator 265 will be energized indicating the status of access/secure switch 27** is the access mode, and appropriate action can be taken to secure the protected area, as by alerting a watchman in the secured area.

Restart Operation

In the event the code generators 35 in the monitoring area and the code generators 22 in the protected area become unsynchronized, the code generators can be resynchronized by effecting a restart operation to load the data word provided in the reset code generators in both areas into the working code generators in the secured and the monitoring areas.

The restart operation is effected by depressing the reset push button **37*a* located on the display panel 37**.

Referring to FIGS. 4 and 6, the restart initiation signal provided on line 75 in response to depressing restart push button **37*a* effects the setting of flip flop 84 over gates 88–93, permitting the restart initiation signal to be gated over buffer gate 79 to set flip flop 72 for enabling gate 66 which passes the restart command, which is comprised of three one-half millisecond pulses separated by one-half millisecond intervals during each 8 millisecond cycle, to be passed to gate 101. Accordingly, gate 101 enables the hold off timer 105 to enable gate 102 permitting the restart signal to be passed over gate 102 and gate 103 to the decoder steering network 34 and line driver 32 for transmission to the zone monitor 20**.

The restart command signal is extended to the pulse counter 122 of the decoder steering network 34 (FIG. 7) and to the monostable circuit 121 which is enabled to provide a 4 millisecond pulse defining a counting time for the counter 122. Accordingly, the counter 122 counts three pulses during the 4 millisecond time established by monostable circuit 121. The outputs of the counter 122 are decoded by the decoding circuit 129, enabling latch 140 to be set at the end of the 4 millisecond duration defined by monostable circuit 121. Thus, when the pulse generator 127 is enabled, providing a 1 millisecond pulse, such pulse is gated over steering gate 125 to the command line 153 and extended to the code generator and control network 35 shown in FIG. 11. It is pointed out that 1 millisecond pulses are provided on command line 153 as long as the push button **37*a* remains depressed or while latch circuit 72** remains set.

Referring to FIG. 11, the restart signal received over line 153 is extended over inverter 211 to enable gate 212 which sets flip flop 214. Gate 212 also extends each of the pulses which comprise the restart command to the clock input cp of the shift register 98 of the reset code generator 182, which is thus sequenced to provide a different code output over outputs QA-QH for each pulse. When flip flop 214 is set, a load command is provided to the load command input LD of shift register 191 of the working code generator 181 which enables the bits provided at the data outputs QA-QH of shift register 198 of the reset code generator 182 to be loaded into the shift register 191 of the working code generator 181.

Referring again to FIGS. 2–5, in response to the release of the restart pushbutton 37*a*, the status change of line 75 causes gates 92–94 to enable reset monostable circuit 87 which provides a reset signal over gate 114 for resetting the latch 72. Alternatively, counter 108, which is stepped by the normal command signals extended over gates 106 and 109 effects reset of the latch 72 after a two second period.

When latch circuit 72 is reset in response to the release of the restart pushbutton 37*a* or the operation of counter 108, gate 67 is inhibited and the system returns to the normal mode of operation with synchronizing pulses, normal commands, being gated over gates 68 and 103 to the code generators in the secured and the monitoring areas.

In the zone monitor 20, the restart command is received by the decoder steering network 23 and decoded in the manner indicated above for the decoder steering network 34 of the monitor receiver, providing the restart command over line 153' which is extended to the code generators 22 of the zone monitor. The code generators 22 of the zone monitor respond to the restart command signal in the manner described above with reference to code generator and control network 35 of the monitoring receiver 30 to effect the transfer of the code word in reset code generator to the working code generator.

Reset Operation

If the reset generators in the secured and monitoring areas do not contain identical words at the time a reset command is issued, identical words provided by the preset data circuits associated with each of the code generators in the secured and monitoring areas are loaded into the reset generators and then transmitted to the working code generators.

Thus, should synchronization fail to occur after a reset operation, the reset push button 37*b* on the display panel 37 is depressed providing a reset initiation signal on line 74 at the input of the command generator (FIGS. 2–5). Referring to FIGS. 2–5, when the restart button 37*b* is depressed, the restart initiation signal provided on line 74 enables gate 90 to set flip flop 84 over gates 92 and 93 for enabling the strobe pulse generator 85 which gates the reset initiation signal over buffer gate 77 to set flip flop 71. The setting of flip flop 71 enables gate 67 to pass the reset command provided by the frequency divider circuit 53 over gate 101 to an input of gate 102. The output of gate 101 enables the hold off timer 105 to disable gate 68 to prevent the normal command signal from being passed to the decoder steering network 34 or to the zone monitor 20. In addition, hold off timer 105 enables gate 102 to pass the reset command signal provided at the output of gate 101 over OR gate 103 and line 104 to the line driver 32 for transmission to the zone monitor and to the decoder steering network 34.

The reset command as extended to the decoder steering network 34 (FIGS. 7–9) is decoded by counting the number of pulses, four in the exemplary embodiment, which are provided within a 4 millisecond period, thereby effecting the setting of latch 141, permitting gate 126 to be enabled for gating 1 millisecond pulses provided by pulse generator 127 to the reset command line 154 to gate the four pulses provided during each 8 millisecond cycle to the code generator and control network 35 over gate 101. Gate 101 enables the hold off timer 105 to enable gate 102 permitting the reset signal to be passed over gates 102 and 103 to the decoder steering network 34 and to the line driver 32 for transmission to the zone monitor 20.

Referring to FIG. 11, the reset command supplied to the code generator control network 183 over line 154 comprises a series of 1 millisecond pulses, the first of which effects the setting of flip flop 219 which clears the counter 218, and permits an enabling signal to be extended over line 230 to the load input LD of the reset code generator to enable the code word established by the switches S1-S8 of the preset data circuit 185 to be loaded into the reset code generator 182 for transfer to the working code generator 181. In addition, the first pulse of the reset command effects the stepping of the counter 218 to a count of one, whereby counter stage 218*a* provides an enabling input for gate 213 to permit subsequent pulses of the reset command to be extended over gate 212 to set flip flop 214, and to the clock input CP of the reset code generator 182. When flip flop 214 is set, a load command is supplied to the load input LD of shift register 191 to the working code generator 181 to enable the bits provided at the data outputs QA-QH of shift register 198 to be loaded into shift register 191.

A similar operation occurs in the zone monitor 20 to effect the transfer of the preset data word into the reset code generator for transfer to the working code generator.

When the system returns to the normal mode of operation in response to the release of the reset push button 37*b* or after the 2 second period defined by counter 107, FIG. 2, the synchronizing pulses provided over normal command lead 151 enable reset circuit, gates 231–235, to provide a reset signal flip flop 214 and 219 enabling the working code generators in the secured and the monitoring areas to operate in the normal mode to provide a pseudo-random code beginning with the starting word loaded from the preset data circuits 185.

Remote Test Operation

The operation of the remote test push button 37*c* on the display panel 37 provides a remote test initiation command signal to the input of the command generator over line 76 (FIGS. 2–6). The remote test initiation signal provided on line 76 effects the enabling of monostable circuit 85 as described above to gate the remote test initiation signal over buffer gate 81 to set flip flop 73 for enabling gate 65 to pass the remote test command signal, which is comprised of 2½ millisecond pulses separated by one-half millisecond off times during each 8 millisecond cycle, to gate 101. Gate 101 enables the hold off timer 105 to inhibit passage of normal command signals and to enable gate 102 to pass the remote test signal over gate 103 to the decoder steering network 34 and to the line driver 32 for transmission over transmission line 40 to the zone monitor 20. The remote test command signal is decoded by the counter 120 and decoder 129 of the decoder steering network 34 to effect the setting of latch circuit 139, FIG. 8, for enabling gate 124 to pass the 1 millisecond pulses provided by pulse generator 127 as enabled by monostable circuit 121 to the remote test command line 152. The remote test command line 152 may be extended to the display panel to light a suitable indicator for indicating that a remote test operation is being performed.

Referring to FIG. 15, the remote test command signal as received at the zone monitor 20 is passed to the decoder steering network 23 wherein the signal is decoded as in the decoder steering network 34 of the monitor receiver to provide a remote test command signal over line 152'. The remote test command signal enables flip flop 316 to be set for energizing the motion simulator which is connected to the output thereof.

In response to the energizing of the motion simulator, the intrusion detector of the alarm source 21 is enabled to respond to provide an alarm indication for enabling exclusive OR gate circuit 317, FIG. 16, to complement bits of the line security code when the system returns to the normal operating mode.

The remote test command is terminated in the command generator 31 in response to the release of the remote test command push button 37*c* or after the 2 second time out provided by counter 108. Accordingly, latch 73 will be reset by the reset pulse generator 86 to inhibit gate 65 and to effect the enabling of gate 68 to permit further normal command pulses to be extended to the code generator circuits 22 and 35 in the secured and monitoring areas.

While in the illustrated embodiment, the system 10 is a point-to-point system for enabling the transmission of alarm data provided by a single alarmm source from a secured area to a monitoring area, it is apparent that with suitable modification of the data select network 24 of the zone monitor and the decoder steering network 34 of the monitor receiver 30, the status of more than one alarm source could be transmitted. In addition, with the inclusion of a suitable multiplexing apparatus, it is possible to permit the transmission of alarm data provided from a plurality of protected area over a common transmission line.

Other reset capabilities may be employed for the code generators 22 and 35 employed in the exemplary system 10. For example, to illustrate the capability and flexibility of the concepts incorporated into the high security, point-to-point system, additional randomness may be applied to the code words by reprogramming the feedback paths of the logic circuits for both the reset and the working code generators through the use of switches or punched cards.

For example, the following different sets of stages may be added modulo-2 (exclusive OR) and the result fed back to the first stage of the eight-stage shift register of the working code generator 191:

a. 1,2,3,4,6,8
b. 2,5,6,8
c. 1,6,7,8
d. 1,3,5,8
e. 2,3,4,8
f. 3,5,6,8
g. 1,5,6,8

Each of the above sets of feedback connections will produce a maximal length sequence. Each of the sets of feedback connections may be obtained using a switch network 239 which is interposed between outputs QA1-QH1 of the stages of shift register 191 and the outputs D11-D18 of the feedback gates, with stage 1 (output QA1) being connected to input D11, stage 2 (output QB1) being connected to input D12, etc. By way of example, the switch network 239 may comprise a printed circuit card and a connector (not shown). In such embodiment, the seven sets of feedback connections are put on different printed circuit cards to enable selective interconnection of the outputs QA1-QH1 of the shift register 191 of the working code generator 181, which are connected to a first set of terminals of the connector to the inputs D11-D18 of the feedback gates, which are connected to another set of terminals of the connector. As an example, one set of feedback connections may be used for each day of the week, this selection being made on a purely arbitrary basis to introduce an added level of uncertainty. The cards may be manually plugged into the system (via the printed circuit card connector) to introduce a new set of feedback connections, thus changing the pseudo-random code sequence and thereby yielding seven unique sequences for the seven days of the week. Cards with idential feedback connections have to be plugged in at both the protected and the monitoring areas. After the cards have been plugged in, in order to synchronize the system, the reset switch is pushed so that the working code generators and the pseudo-random sequences produced by them at both ends are identical and in synchronism.

When the cards are plugged in, the appropriate feedback connections are made with the appropriate shift register output and input stages. For example, referring to FIGS. 11A and 11B, for one set of feedback connections, example (a) above, where shift register stages 1,2,3,4,6, and 8 are added, input D11 is connected to output QA1, input D12 to output QB1,. . . input D18 to output QH1, and input D19 is connected to the serial input terminal of the shift register 191 which constitutes the working code generator 181.

Similarly, for the feedback logic circuits shown in FIGS. 11C–11H, inputs D11-D18 are connectable to respective outputs QA1-QH1 of shift register 191, output D19 being connected to the serial input terminal of the shift register 191.

Emplying different feedback connections in the reset and working code generators assures that the reset operation causes a dramatic shift in the location of the operating point in the pseudo-random sequence. Also, a stage of the shift register from which the output is taken could be varied from time to time to complicate the decoding problem for an attacker. Moreover, two working generators may be used, periodically selecting either pseudo-randomly, or as dictated by a further generator, the actual code generator employed to provide the line security code.

Further techniques may include skipping an occasional bit in the pseudo-random code sequence to complicate the coding process. This techniques is effectively accomplished in the exemplary embodiment through the transmission of the access/secure switch status bit in place of one bit of the line security code. Moreover, one or more of the code bits of the line security code may be complemented periodically to arbitrarily vary the pseudo-random sequence. Another technique involves the periodic insertion of an arbitrary one or zero into the code sequence to break up a long sequence of identical bits. For example, after six logic one level bits have been transmitted, a logic zero bit may arbitrarily be inserted.

SECOND EMBODIMENT

Referring to FIG. 17, there is shown a block diagram for a second embodiment for a security system 10' including a zone monitor 20' at a protected area 11' and a monitor receiver 30' at a monitoring area 12' which are inter-connected by a transmission line 40'. In the security system 10', line security code words and alarm code words are stored at the monitoring and protected areas. For securing the transmission line 40', the line security code words at the protected area are periodically read out of storage and transmitted to the monitoring area and compared with identical reference code words stored at the monitoring area. For transmitting an alarm indication from the protected area 11' to the monitoring area 12', an alarm code word is transmitted from the secure area to the monitoring area and compared with an identical reference alarm code word provided at the monitoring area.

The zone monitor 20' at the protected area includes a line security code storage unit 401 which stores a plurality of different code words in a predetermined sequence. The line security code words are periodically read out in sequence under the control of clock pulses provided by a clock pulse generator 408, and transmitted over the transmission line 40' to the monitor receiver 30' at the monitoring area. The monitor receiver 30' includes a further line security code storage unit 405 which stores the same code words in the same sequence as the line security code storage unit 401 and which are read out in sequence in response to the clock pulses in synchronism with the readout of the code words from code storage unit 401. Each line security code word received from the secured area is compared in a code comparator 407 with the corresponding word retrieved from the code storage unit 405 in the monitoring area. When the protected area 11 and the transmission line 40' are secure, the code words compared in the code comparator 407 are identical while the failure of the code words to compare indicates an alarm condition.

When an alarm condition is detected by an alarm source 404 for the secured area, the zone monitor 20' is enabled to transmit an alarm code word stored in an alarm code storage unit 402 to the monitoring area. The storage unit 402 stores a plurality of different alarm code words in a predetermined sequence, each of the alarm code words being distinct from the line security code words stored in code storage unit 401. Code selector 403, controlled by the alarm source 404, inhibits the transmission of the next line security code word of the sequence and enables the next alarm code word provided by the alarm code storage unit 402 to be transmitted to the monitor receiver 30'. The monitor receiver 30' includes a further alarm code storage unit 406 which stores a plurality of alarm code words which are identical to the alarm code words stored in code storage unit 402.

Control logic 410 of the monitor receiver 30' interprets outputs provided by the code comparator 407 and enables an alarm code word to be retrieved from the alarm code storage unit 406 whenever the code word received from the secured area fails to compare with the reference line security code word. The alarm code retrieved from storage unit 406 is then compared with the code word received from the secured area 11'. The control logic 410 also effects the energization of appropriate alarm indicators.

Referring to FIG. 18, there is shown a block and partial schematic representation of the zone monitor 20' By way of example, the line security code storae unit 401 and the alarm code storage unit 402 may each comprise an electronic memory. The storage unit 401 stores 1440 different eleven bit code words enabling a different code word to be read out and transmitted to the monitoring area at one minute intervals for a given day. The alarm storage unit 402 stores 608 different eleven bit words which are also different from each of the 1440 line security code words stored in storage unit 401.

Alternatively, the line security codes and the alarm codes may be stored on punched tapes, and the line security code storage unit 401 and the alarm code storage unit 402 may be paper tape readers such as the model 601, commercially available from Addmatic Corporation. However, since such tapes commonly store 8 bit words, providing a total of 256 different words, in such embodiment, twenty of the words may be designated as alarm codes with the remaining code words comprising the line security code words. In this embodiment, with a line security word being transmitted once each minute, each word is used on an average of six times each day in a varying sequence to provide a substantially random sequence of 1440 code words In either embodiment, the line security code storage unit 405 and the alarm code storage unit 406 of the monitor receiver 30' are identical to the corresponding units of the zone monitor 20', the store identical code words in the same sequences.

The code selector circuit 403 normally enables the line security code words to be transmitted to the monitoring area, and whenever an alarm condition is to be indicated, permits an alarm code word to be transmitted. The code selector circuit 403 comprises a pair of AND gates 421 and 422 which enable the passage of the line security code words and the alarm code words, respectively, to the transmission line 40' over an OR gate 423. An inhibit circuit 424, enbodied as an exclusive OR circuit, normally provides an enabling signal for gate 421 when no alarm is present.

The output of the line security code storage unit 401 is extended to an input 421a of AND gate 421 and to an input **424*a* of the exclusive OR circuit 424. A second input 424*b* of the exclusive OR circuit 424 is connected to the output of the alarm source 404, and the output 424*c* of the exclusive OR circuit 424 is connected to a second input 421*b* of gate 421, the output 421*c* of which is connected to an input 423*a* of gate 423**.

The output of the alarm code storage unit 402 is connected to an input **422*a* of gate 422 which has a second input 422*b* connected to the output of the alarm source 404. The output 422*c* of gate 422 is connected to a second input 423*b* of gate 423**.

In the normal mode, the output of the alarm source 404 is at a logic zero level inhibiting gate 422 and enabling gate 424 to pass the line security code to gate 412 unaltered such that gate 421 is enabled to pass the line security code words to the transmission line 401 over gate 423 as they are read out of the storage unit 401.

When an alarm is registered, the output of the alarm source 404 goes to a logic one level and thus enables gate 422 to permit alarm codes read out of storage unit 402 to be passed over OR gate 423 to the transmission line 40'. In addition, the exclusive OR circuit 424 effects the inversion of each bit of the line security codes read out of storage unit 401 to inhibit gate 421 to prevent the line security codes from being transmitted to the monitoring area as long as the alarm condition exists.

Figure 19:
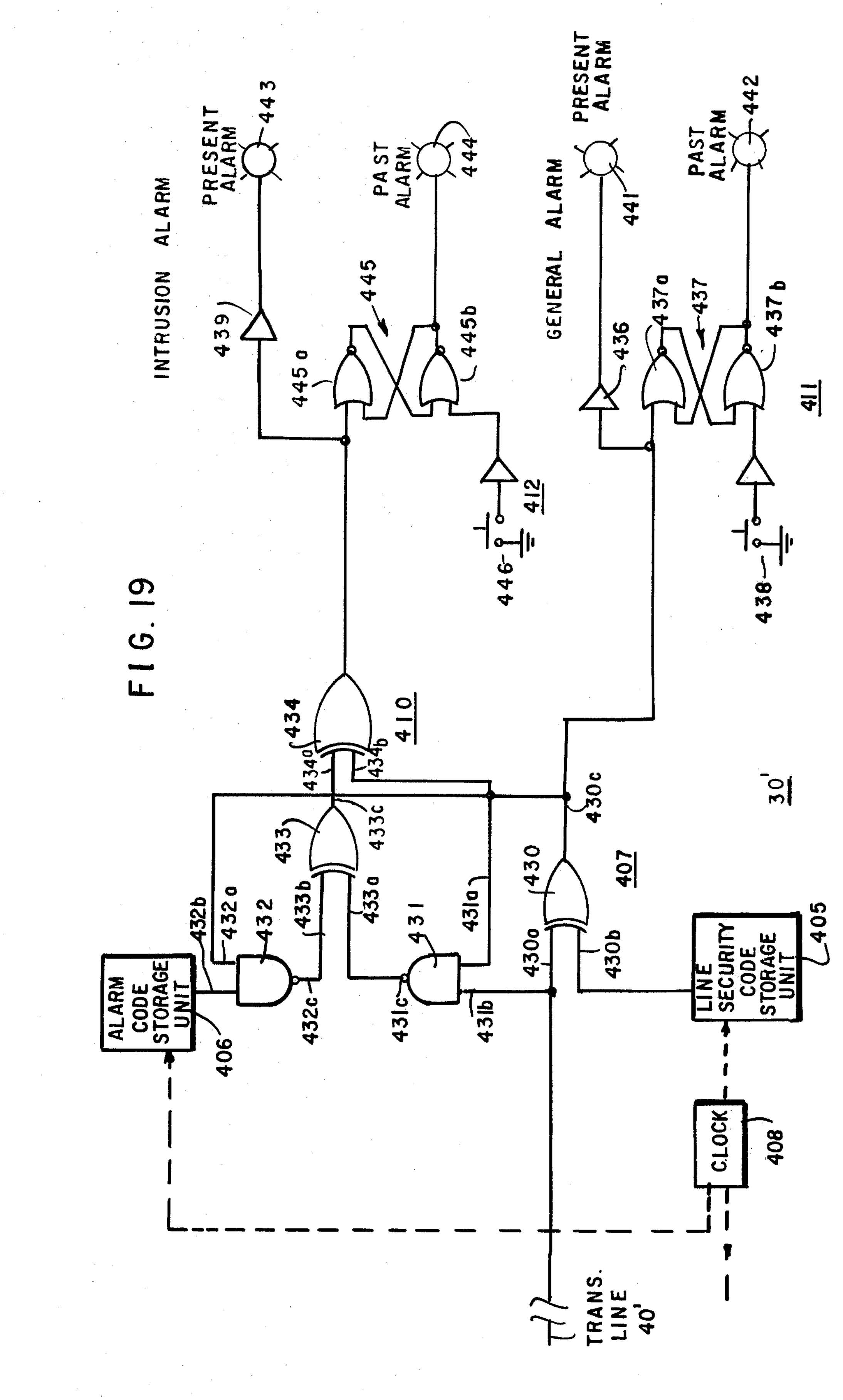
FIG. 19 is a schematic representation of apparatus employed in the monitoring area of the system shown in FIG. 17.

Referring to FIG. 19, which is a block and partial schematic representation of the monitor receiver 30', the code words transmitted from the secured area 11 are received and processed.

The transmission line 40' at the monitoring end is connected to an input 430*a* of the comparator circuit 407, which is embodied as an exclusive OR circuit 430. A second input of the exclusive OR circuit 430 is connected to the output of the reference security code storage unit 405 to receive the reference code. The line security code word transmitted from the secured area is normally identical to the line security code provided at the monitoring area, and thus the code words supplied to the inputs 430*a* and 430*b* are identical whenever the transmission line 40' and the protected area are secure. For such conditions, the output of the exclusive OR circuit 430 is at logic zero level.

If the received code word is not identical to the reference code word due to an alarm condition at the protected area 11' or as the result of tampering with the transmission line 40', the output of the exclusive OR circuit 430 becomes logic one level.

The output 430*c* of the exclusive OR circuit 430 is connected to the alarm indicating circuit 411 which includes alarm indicating devices 441 and 442, embodied as light emitting diodes, for indicating the failure of line security codes to compare.

Whenever a logic one level output is provided by exclusive OR circuit 430, such output, as extended over inverter 436 energizes indicator 441. In addition, the alarm output is latched in a flip flop 437 which then energizes indicator 442 to maintain the alarm indication in the event the next code word received from the secured area compares witht the next reference code word provided at the monitoring area 12. A reset button 438 enables manual reset of flip flop 437.

To determine if the lack of comparison of the received code word with the reference code word is the result of an alarm condition for the secured area 11, and that the code word transmitted from the secured area 11 is an alarm code word, a second comparison is effected under the control of the control logic circuits 410.

The control logic circuit 410 includes AND gates 431 and 432 which have respective inputs 431*a* and 432*a* connected to the output 430*c* of exclusive OR circuit 430. Second inputs 431*b* and 4232*b* are connected to the transmission line 40' and the reference alarm code storage unit 406, respectively. Gates 431 and 432 have respective outputs 431*c* and 432*c* connected to individual inputs 433*a* and 433*b* of an exclusive OR circuit 433.

Gates 431 and 432 are enabled whenever a logic one level output is provided at the output 430*c* of exclusive OR circuit 430 to extend the received code word and the next reference alarm code word provided at the output of alarm storage unit 406 to the outputs 433*a* and 433*b*, respectively of exclusive OR circuit 433. If the code words compared by exclusive OR circuit 433 are identical, exclusive OR circuit 433 provides a logic zero level output at output 433*c* thereof which is connected to an input 434*a* of a further exclusive OR circuit 434 which has a second input 434*b* connected to output 430*c* of exclusive OR circuit 430. Accordingly, when the received code is an alarm code and such code compares with the reference alarm code provided by reference alarm code storage unit 406, exclusive OR circuit 434 is enabled to provide a logic one level output which is extended to the intrusion alarm indicator circuit 412 which includes alarm indicating devices 443 and 444, embodied as light emitting diodes, for indicating an intrusion alarm.

Whenever a logic one level output is provided by an exclusive OR circuit 434, such output as extended over inverter 439 energizes indicator 443. In addition, the alarm output is latched in a flip flop 445 which then energizes indicator 444 to maintain the alarm indicator. A reset button 446 enables manual reset of flip flop 445.

In the event the received code does not compare with the reference alarm code provided by alarm code storage unit 406, exclusive OR circuit 433 provides a logic 1 level output which inhibits exclusive OR circuit 434 preventing energization of the alarm indicators 443 and 444 thereby identifying the alarm condition as a line alarm.

In the disclosed embodiments, the clock 408 of the monitor receiver 30' provides synchronization for the operation of the code sources 401, 402, 405 and 406 at the secured and monitoring areas. Preferably, the clock pulses are transmitted to the protected area over the transmission line 40'.

It is pointed out that a synchronous operation may also be employed. In each case, the code comparison operation including the readout of a reference code word at the monitoring area 12 is not effected until a code word is received from the zone monitor 20'. A clock located in the secured area effects the sequencing of the line security code transmission from the protected area, to the monitoring area at a predetermined rate for example, one clock pulse each N seconds.

To guard against tampering with the transmission line that could interrupt code transmission between the secured area and the monitoring, a timing circuit (not shown) may be employed to effect the generation of an alarm if a line security code word fails to be received within a predetermined time. Receipt of a code word by the monitor receiver triggers the timing circuit which measures a time duration greater than 2N seconds. Failure of a new code word to be received from the protected area 11' within such time period causes an alarm to be indicated.

We claim:

1. In a security system including a transmission line for permitting the transmission of information between a secured area and a monitoring area, monitoring means at said secured area including code means operable to continuously provide a line security code comprised of a sequence of code bits, data means for providing at least one data bit representing information to be transmitted to said monitoring area, and select means for receiving the bits of said line security code and said data bit, and means for controlling said select means to provide a modified line security code, including selected code bits of said line security code and said data bit, which is continuously transmitted over said transmission line to said monitoring area, and receiver means at said monitoring area including means for receiving said modified line security code, first means responsive to said selected code bits of the line security code to provide a first output indicative of the security of the transmission line, and second means responsive to said data bit to provide a second output representing said information.

2. A security system as set forth in claim 1 wherein said first means includes further code means operable to continuously provide a reference code comprised of a sequence of code bits which is identical to said line security code and comparator means for comparing the selected code bits of the line security code with corresponding bits of the reference code and the operable to provide said first output whenever the compared bits are different.

3. In a security system including a transmission line for permitting the transmission of information between a secured area and a monitoring area, monitoring means at said secured area including code means operable to continuously provide a line security code comprised of a sequence of code bits, data means for providing at least one data bit representing information to be transmitted to said monitoring area, and select means for receiving the bits of said line security code and said data bit, and means for controlling said select means to provide a modified line security code, including selected code bits of said line security code and said data bit, for transmission over said transmission line to said monitoring area, and receiver means at said monitoring area including means for receiving said modified line security code, first means having further code means operable to continuously provide a reference code comprised of a sequence of code bits which is identical to said line security code, and comparator means for comparing the selected code bits of the line security code with corresponding bits of the reference code and operable to provide a first output whenever the compared bits are different, second means responsive to said data bit to provide a second output representing said information, and synchronizing means normally operable in a first mode for providing a signal for synchronizing the operation of said further code means with said code means at said secured area.

4. A security system as set forth in claim 3 wherein said further code means includes a first code generating means and said code means at said secured area includes a second code generating means, said first and second code generating means being responsive to said synchronizing signal to operate in synchronism to provide a known pseudo-random code word for use in generating said line security code and said reference code, said synchronizing means being operable in a second mode to control said first and second code generating mean to provide a different code word to thereby modify the reference code and the line security code provided by said first and second code generators, respectively.

5. A security system as set forth in claim 4 wherein said first and second code generating means each include reset means responsive to a second signal provided by said synchronizing means for resetting said first and second code generating means to provide identical code words.

6. A security system as set forth in claim 5 wherein said reset means includes further code generating means operable to provide further pseudo-random code word and control means responsive to said second signal to effect the transfer to said further code word to said first and second code generating means.

7. A security system as set forth in claim 6 wherein said reset means further includes means for providing a further code word comprised of a plurality of code bits in a pre-selected sequence, said control means being responsive to a third signal provided by said synchronizing means to effect the transfer of said further code word to said first and second code generating means.

8. A security system as set forth in claim 3 including alarm source means for modifying the line security code to indicate an alarm condition for said secured area, said monitoring mean including alarm source test means said synchronizing means being operable in a further mode to provide a fourth signal for transmission over said transmission line to said monitoring means to enable said alarm source test means to test the operability of said alarm source means.

9. A security system as set forth in claim 4 wherein said first and second code generating means each include first shift register means and feedback means responsive to said synchronizing signal to provide said pseudo-random code words, and second shift register means and further feedback means responsive to said synchronizing signal to provide a further pseudo-random code word, and said first and second code generating means each including control means responsive to a further signal provided by said synchronizing means to effect the transfer of said further code word from said second shift register means to said first shift register means.

10. A security system as set forth in claim 3 wherein said synchronizing means includes command generating means for continuously generating a plurality of distinct command signals including said synchronizing signal, and further command signals for controlling the synchronization of said code means and said further code means, and enabling means responsive to command initiation signals for selecting the command signal to be provided.

11. A security system as set forth in claim 10 wherein said command generating means includes time base generating means and command signal formulation means controlled by said time base generating means to provide said command signals, wherein different ones of said command signals comprise a different number of pulses within a predetermined time period.

12. A security system as set forth in claim 11 wherein said receiver means includes first decoder means responsive to the command signals provided by said synchronizing means to provide control signals for said first code generating means over a plurality of outputs of said first decoder means, said first decoder means including pulse counting means for counting the number of pulses of the command signal whereby different command signals cause control signals to be provided over a different one of said outputs of said first decoder means, and said monitoring means includes a second decoder means responsive to the command signals provided by said synchronizing means to provide control signals for said second code generating means over a plurality of outputs of said second decoder means, said second decoder means including pulse counting means for counting the number of pulses of the command signal whereby different command signals cause control signals to be provided over a different one of said outputs of said second decoder means.

13. In a security system including a transmission line for permitting information to be transmitted between a protected area and a monitoring area, monitoring means at said protected area including alarm source means operable in access and secure modes, status means for providing a status bit indicating the operating mode for said alarm source means, first code generating means operable to provide a first sequence of code bits, select means for receiving the bits of said first sequence and said status bit and for transmitting preselected code bits of said first sequence and said status bit over said transmission line to said monitoring area, and receiver means at said monitoring area including second code generating means for generating a second sequence of code bits which is identical to the first sequence of code bits, further status means for providing a reference status bit indicating a desired operating mode for said alarm source means, first comparator means for comparing the code bits of the first sequence with corresponding bits of the second sequence, and second comparator means for comparing the status bit with the reference status bit, and alarm means controlled by said comparator means for providing an alarm indication whenever one of the compared bits are different.

14. A security system as set forth in claim 13 wherein said receiver means includes synchronizing means operable to provide a signal for synchronizing the operation of said first and second code generating means, said select means including first gating means having an input connected to an output of said first code generating means and second gating means having an input connected to an output of said status means, output means connecting outputs of said first and second gating means to said transmission line, and enabling means responsive to said synchronizing signal for enabling said first gating means for a first predetermined duration to enable said preselected code bits to be transmitted to said monitoring area and for enabling said second gating means for a second predetermined duration to enable said status bit to be transmitted to said monitoring area.

15. A security system as set forth in claim 14 wherein said monitoring means further includes steering network means, and input means interposed between said transmission line and said steering network means to extend said synchronizing signal to said steering network said steering network means including means responsive to said synchronizing signal to enable said synchronizing signal to be extended to said first code generating means and to said select means.

16. A security system as set forth in claim 15 wherein said input means includes line receiver means and normally disabled gating means interposed between an output of said line receiver means and an input of said steering network means, said line receiver means being continuously operable to receive data provided on said transmission line and said steering network means including means for enabling said gating means whenever a synchronizing signal is provided on said transmission line, said output means including line driver means and said select means including means for enabling said line driver means at a predetermined time after said gating means has been enabled.

17. A security system as set forth in claim 14 wherein said receiver means includes steering network means including third and fourth gating means having outputs connected to inputs of said first and second comparator means, respectively, input means connecting respective first inputs of said third and fourth gating means to said transmission line to permit said code bits and status bit to be extended to said third and fourth gating means, and enabling means responsive to said synchronizing signal for enabling said first gating means for a first predetermined time to permit said selected code bits to be passed to said first comparator means and for enabling said second gating means for a second predetermined duration to permit said status bit to be gated to said second comparator means.

18. A security system as set fourth in claim 16 wherein said first comparator means includes a comparator circuit for receiving said selected code bits at a first input and the corresponding bits of the reference code at a second input and operable to provide a first output signal whenever the code bits at said first and second inputs are the same, and a second output signal whenever the code bits at said first and second inputs are different, and gating means enabled by said enabling means to gate the output signal provided by said comparator circuit to said alarm means, and wherein said second comparator means comprises a second comparator circuit for receiving said status bit at a first input thereof and said reference status bit at a second input thereof and for providing first output signal whenever the bits supplied to said first and second inputs are the same and a second output signal whenever the bits supplied to said first and second inputs are different, and further gating means enabled by said enabling means to gate the output signal provided by said further comparator circuit to said alarm means.

19. A security system as set forth in claim 17 wherein said receiver means includes output means including normally enabled line driver means interposed between an output of said synchronizing means and said transmission line, said input means including line receiver means and normally disabled gating means operable when enabled to extend said code bits and said status bit provided by said monitoring means to said steering network means, said steering network means including means responsive to each synchronizing signal to enable said gating means and to inhibit said line driver means for a predetermined time after each synchronizing signal is provided.

20. A security system as set forth in claim 13 wherein said receiver means includes command generating means for continuously generating a plurality of distinct command signals including a first command signal for synchronizing the operation of said first and second code generating means and second and third command signals, gating means including an individual gate circuit associated with each of said command signals and enabling means responsive to command initiation signals for selecting the command signal to be provided by said command generating means.

21. A system as set forth in claim 20 wherein said first and second code generating means each include a working code generator normally operable to provide a pseudo-random sequence of code bits, and a reset code generator operable to provide a further pseudo-random sequence of code bits, and enabling means responsive to said second command signal to effect transfer of the code word provided by said reset code generator to said working code generator.

22. A system as set forth in claim 21 wherein said first and second code generating means each include a preset data circuit for providing a preset data word, said enabling means being responsive to said third command signal to effect the transfer of said preset data word to said reset code generator.

23. A security system as set forth in claim 20 wherein said command generating means includes clock pulse generating means for providing clock pulses at a predetermined rate and command formulation means, including said gating means, responsive to said clock pulses to provide a first number of pulses within a predetermined time period to define said first command signal, a second number of pulses within said predetermined time period to define said second command signal and a third number of pulses within said predetermined period to define said third command signal.

24. A security system as set forth in claim 23 wherein said command generating means is normally operable to provide said first command signal over a first gate circuit of said gating means, said enabling means including at least first and second latch circuit means, said first and second latch circuit means being set in response to respective first and second command initiation signals to effect disabling of said first gate circuit and to enable respective second and third gate circuits of said gating means to enable said command generating means to provide said second and third command signals, respectively.

25. A security system as set forth in claim 20 wherein said receiver means includes first decoder means for decoding the command signal provided by said synchronizing means and for supplying to said first code generating means an enabling signal indicative of an operation to be performed, said monitoring means including second decoder means for decoding the command signal provided by said synchronizing means and for supplying to said second code generating means an enabling signal indicative of an operation to be performed.

26. In a security system including a transmission line extending between a secured area and a monitoring area, apparatus for securing the transmission line and for enabling the transmission of information between said monitoring and secured areas, said apparatus comprising a first working code generating means at said secured area normally operable to provide a line security code comprised of a known, pseudo-random sequence of code bits for transmission over said transmission line to the monitoring area, a first reset code generating means operable to provide a pseudo-random code word, and first control means operable upon command to transfer the code word provided by said first reset code generating means to said first working code generator, a second working code generating means at said monitoring area operable in synchronism with said first working code generating means to generate a reference code with is identical with said line security code for comparison with the line security code sequence transmitted from the secured area to permit an alarm indication to be provided whenever the code sequences are different, a second reset code generating means operating in synchronism with said first reset code generating means to provide a code word which is identical to the code word provided by said first reset code generating means and second control means operable upon command to transfer the code word provided by said second reset code generating means to said second working code generating means, and command generator means at said monitoring area normally operable to provide a first command signal for synchronizing the operation of said first and second working code generating means and controllable to provide a second command signal for effecting the transfer of the code words provided by said first and second reset code generating means to said first and second working code generating means, respectively.

27. A system as set forth in claim 26 which includes a first preset code word means at said secured area, and a second preset code word means at said monitoring area, said command generator means being controllable to provide a third command signal for effecting the transfer of a preset code word provided by said first and second preset code word means to said first and second reset code generating means, respectively.

28. A security system as set forth in claim 26 wherein said first and second working code generating means each comprise a first multistage shift register means and feedback means including a first gating means having inputs connected between outputs of certain stages of said first shift register means and an output connected to an input of said first shift register means to provide feedback signals to enable said pseudo-random sequence to be provided.

29. A security system as set forth in claim 28 wherein said first and second reset code generating means each comprise second multistage shift register means and further feedback means including a second gating means having inputs connected between outputs of certain stages of said second shift register means and an output connected to an input of said shift register means to provide feedback signals to enable said pseudo-random code word to be provided.

30. A security system as set forth in claim 29 which includes means for enabling the connections of the inputs of said first and second gating means to the outputs of respective first and second shift register means to be changed periodically to thereby provide different pseudo-random codes.

31. In a security system including a transmission line extending between a secured area and a monitoring area, apparatus for securing the transmission line and for enabling the transmission of information between said monitoring and secured areas, said apparatus comprising a first code means at said secured area including a first code source for providing a first code word and a second code source for providing a second code word, and control means for normally enabling the code word provided by said first code source to be transmitted over said transmission line to said monitoring area, second code means at said monitoring area including a third code source for providing a code word which is identical to the code word provided by said first code source, a fourth code source for providing a code word which is identical to the code word provided by said second code source, comparator means for receiving the code word transmitted for said secured area, and second control means for normally enabling the code word provided by said third code source to be extended to said comparator means, said comparator means being operable to compare the code word received from said secured area with the code word provided by said third code source and to provide an output whenever the code words are different, said first control means being enabled upon command to transmit the code word provided by said second code word source over said transmission line to said monitoring area and said second control means being operable upon command to extend the code word provided by said fourth code source to said comparator means for comparison with the code word received from said secured area.

32. A security system as set forth in claim 31 wherein said first code source stores a plurality of different code words and wherein said third code source also stores a plurality of code words which are identical with the code words stored in said first code source and wherein said second control means includes means for providing a synchronizing signal for effecting sequential readout of the code words stored in said first and third code sources.

33. A security system as set forth in claim 32 wherein said second code source stores a plurality of different code words and wherein said fourth code source stores a plurality of different code words each of which is identical with the code words stored by said second code source, said first control means including means for inhibiting the transmission of code words from said first code source and for enabling the transmission of code words provided by said second code source to indicate an alarm, and said second control means including means controlled by said comparator means whenever the compared words are different to prevent the code words provided by said third code source from being extended to said comparator means and to enable the code words provided by said fourth code source to be extended to said comparator means.

34. A security system as set forth in claim 31 wherein said first code source comprises a first code generating means normally operable to provide a pseudo-random code word and wherein said third code source comprises a second code generating means normally operable to provide a pseudo-random code word which is identical to the code word provided by said first code generating means.

35. A security system as set forth in claim 34 wherein said second code source comprises a third code generating means operable to provide a pseudo-random code word and said fourth code source comprises a fourth code generating means operable to provide a pseudo-random code word, said first control means being operable when enabled to effect the transmission of the code word provided by said third code generating means to said monitoring are over said first code generating means and said second control means being operable when enabled to enable the code word provided by said fourth code generating means to be extended to said comparator means over said second code generating means, and enabling means at said monitoring area for enabling said third and fourth code generating means.

36. In a security system including a transmission line for permitting the transmission of information between a secured area and a monitoring area, monitoring means at said secured area including first code source means for providing at least first and second sequences of different code words and select means for normally enabling the transmission of said first sequence of code words over said transmission line to said monitoring area, receiver means at said monitoring area including second code source means for normally providing third and fourth sequences of code words which are identical with said first and second sequences of code words, respectively, control means for normally enabling the comparison of the code words of said first and third sequences and for providing an indication whenever the code words compared are different, and alarm means at said secured area for controlling said select means to enable the code words of said second sequence to be transmitted to said monitoring area for indicating an alarm condition, said control means being operable when code words of said second code sequence are transmitted to said monitoring area to effect the comparison of the code words of the fourth sequence with the code words of the second sequence and for providing a further indication whenever the code words compared are the same.

37. In a security system including a transmission line to permit the transmission of alarm information between a secured area and a monitoring area, monitoring means at said secured area including a first code storage means storing a plurality of line security code words in a predetermined sequence, and enabling means interposed between the output of said first code storage means and said transmission line for normally enabling said code words to be transmitted to said monitoring area over said transmission line, and receiver means at said monitoring area including second code storage means storing a plurality of reference code words which are identical with the code words stored by said first code storage means, sequencing means for providing sequencing signals for transmission to said secured area for controlling said first code storage means to effect the readout of said line security code words for transmission to said monitoring area, said second code storage means being responsive to said sequencing signals to provide said reference code words in synchronism with the readout of the line security code words at said secured area, code word comparator means for comparing the line security code words transmitted from said secured area with the corresponding reference code words provided by said second code storage means, and alarm indicator means controlled by said code word comparator means to provide an alarm indication whenever the code words compared are different.

38. A system as set forth in claim 37 wherein said monitoring means includes third code word storage means for storing a plurality of alarm code words which are periodically readout in response to said sequencing signals, and alarm source means for controlling said enabling means in response to an alarm condition for inhibiting the transmission of said line security code words and for enabling said alarm code words to be transmitted to said receiver means over said transmission line, said receiver means including fourth code word storage means for storing a plurality of further reference alarm code words which are identical with the code words stored by said third code word storage means, and control means enabled by said code word comparator means whenever the code words compared are different to enable the reference alarm code words stored in said fourth code word storage means to be extended to said code word comparator means for comparison with the alarm code words being transmitted from said secured area.

39. A system as set forth in claim 38 wherein said alarm indicator means includes first means enabled by said code word comparator means to provide a first indication whenever the code word received from said secured area and the reference code word extended to said code word comparator means are different, and second means enabled by said comparator means to provide a second indication whenever the code word received from said secured area is identical with the reference alarm code word extended to said code word comparator means.

40. In a security system including a transmission line extending between first and second locations for permitting bidirectional transmission of information therebetween, first means at said first location including first line driver means connected to said transmission line and normally enabled to transmit data to said second location, and first line receiver means continuously enabled to receive data transmitted to said first location from said second location for processing by a first data processing means, second means at said second location including second line receiver means continuously enabled to receive data transmitted to said second location from said first location for processing by a second data processing means, and second line driver means normally disabled and operable when enabled to transmit data to said first location, said second means including normally disabled gating means interposed between said second line receiver means and said second data processing means, and first control means responsive to the receipt of data from said first location to enable said gating means to gate said data to said second data processing means and for enabling said second line driver means to transmit further data to said first location, said first means including further normally disabled gating means interposed between said first line receiver means and said first data processing means, and second control means responsive to the data transmitted by said first line driver means to inhibit said first line driver means after a predetermined time and to enable said further gating means to permit said further data to be extended to said first data processing means.

41. In a security system including a transmission line for permitting the transmission of information between a secured area and a monitoring area, monitoring means at said secured area including first code generating means having first multistage shift register means and first programmable feedback means having inputs connected between outputs of certain stages of said first shift register means and an output connected to an input of said first shift register means to provide feedback signals to enable said first shift register means to provide a line security code comprised of a known, pseudo-random sequence of code bits for transmission over said transmission line to said monitoring area, and receiver means at said monitoring area including second code generating means having second multistage shift register means and second programmable feedback means having inputs connected between outputs of certain stages of said second shift register means and an output connected to an input of said second shift register means to provide feedback signals to enable said second shift register means to provide a reference code comprised of a pseudo-random sequence of code bits which is identical to the line security code sequence for comparison with the line security code sequence to permit an indication to be provided whenever compared bits differ, and means for enabling the conections of the inputs of said first and second feedback means to the outputs of said first and second shift register means, respectively to be changed periodically to vary the known pseudo-random code sequences provided by said first and second code generating means.

42. In a security system including a transmission line extending between a secured area and a monitoring area, apparatus for securing the transmission line and for enabling the transmission of information between said monitoring and secured areas, said apparatus comprising first code generating means at said secured area operable to provide a code word for use in the generation of a line security code for transmission over said transmission line to the monitoring area, second code generating means at said monitoring area operable to provide a code word for use in the generation of a reference code for comparison with the line security code transmitted from the secured area, and synchronizing means for providing a first signal for application to said first and second code generating means, means for synchronizing the operation of said first and second code generating means to enable said first and second code generating means to provide identical codes and reset means responsive to a further signal provided by said synchronizing means to control said first and second code generating means to modify the code words for said first and second code generating means thereby modifying the identical codes provided by said first and second code generating means.

43. In a security system including a transmission line extending between a secured area and a monitoring area, apparatus for securing the transmission line and for enabling the transmission of information between said monitoring and secured areas, said apparatus comprising first storage means at said secured area having a plurality of storage locations each storing a different one of a first plurality of different code words, second storage means at said monitoring area having a plurality of storage locations each storing a different one of a second plurality of code words which are identical with the code words stored by said first storage means, means for enabling sequential transmission of the code words of the first plurality to said monitoring area over said transmission line, means for receiving the code words of said first plurality transmitted over said transmission line, and for comparing each of the code words of said first plurality with a corresponding code word of said second plurality, and means for providing an alarm indication whenever the code words compared are different.

* * * * *